US006456320B2

(12) United States Patent
Kuwano et al.

(10) Patent No.: US 6,456,320 B2
(45) Date of Patent: Sep. 24, 2002

(54) MONITORING SYSTEM AND IMAGING SYSTEM

(75) Inventors: Yukinori Kuwano, Katano; Toshiyuki Okino, Kadoma; Takashi Ikeda, Higashiosaka; Masato Arisawa, Hirakata; Hideto Fujita, Kadoma; Haruhiko Murata, Takatsuki, all of (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/084,315

(22) Filed: May 26, 1998

(30) Foreign Application Priority Data

| | | |
|---|---|---|
| May 27, 1997 | (JP) | 9-137306 |
| Jun. 4, 1997 | (JP) | 9-146157 |
| Jun. 5, 1997 | (JP) | 9-147454 |
| Jun. 5, 1997 | (JP) | 9-147716 |
| Jun. 5, 1997 | (JP) | 9-147717 |

(51) Int. Cl.[7] .................... H04N 7/18
(52) U.S. Cl. .................... 348/143; 348/152
(58) Field of Search .................... 348/143, 135, 348/154, 155, 152, 164, 186

(56) References Cited

U.S. PATENT DOCUMENTS

| | | | | | |
|---|---|---|---|---|---|
| 4,249,207 | A | * | 2/1981 | Harman et al. | 358/108 |
| 4,458,266 | A | * | 7/1984 | Mahoney | 348/143 |
| 5,091,780 | A | * | 2/1992 | Pomerleau | 358/108 |
| 5,095,365 | A | * | 3/1992 | Takatoo et al. | 348/143 |
| 5,111,288 | A | * | 5/1992 | Blackshear | 348/143 |
| 5,283,644 | A | * | 2/1994 | Maeno | 348/152 |
| 5,289,275 | A | * | 2/1994 | Ishii et al. | 348/154 |
| 5,745,166 | A | * | 4/1998 | Rhodes et al. | 348/143 |
| 5,825,413 | A | * | 10/1998 | Mullis | 348/155 |
| RE36,041 | E | * | 1/1999 | Turk et al. | 382/118 |
| 5,880,776 | A | * | 3/1999 | Kim | 348/155 |
| 5,969,755 | A | * | 10/1999 | Courtney | 348/143 |
| 5,980,123 | A | * | 11/1999 | Heifler | 396/427 |

* cited by examiner

*Primary Examiner*—Vu Le
(74) *Attorney, Agent, or Firm*—Arent, Fox, Kintner, Plotkin & Kahn, PLLC

(57) ABSTRACT

The present invention relates to a monitoring system capable of automatically detecting and reporting to a supervisor that a person enters a monitoring area from an area outside the monitoring area. The present invention comprises an imaging device for imaging the monitoring area, and means for detecting information relating to the movement of an object in the monitoring area.

2 Claims, 22 Drawing Sheets

MONITORING SYSTEM AND IMAGING SYSTEM

BACKGOUND OF THE INVENTION

1. Field of the Invention

The present invention relates to a monitoring system capable of detecting that a person enters a monitoring area from an area outside the monitoring area, or a person exists from the monitoring area to the area outside the monitoring area.

The present invention relates to a monitoring device capable of imaging a characteristic part such as the face of an entering person.

The present invention relates to a monitoring device capable of monitoring a place which cannot be monitored by an imaging device such as a CCD (Charge Coupled Device) camera in the night, for example.

The present invention relates to an imaging system for intermittently recording a picked-up image of a subject.

2. Description of the Prior Art

[1] An example of a conventional monitoring system for prevention is one for always imaging a monitoring area using a video camera, and displaying a picked-up image on a monitor as well as recording the picked-up image on a video tape. In such a monitoring system, an image projected on the monitor must be always monitored by a supervisor in order to know that a person enters the monitoring area from an area outside the monitoring area.

An object of the present invention is to provide a monitoring system capable of automatically detecting and reporting to a supervisor that a person enters a monitoring area from an area outside the monitoring area.

Another object of the present invention is to provide a monitoring system capable of automatically detecting that a person enters a monitoring area from an area outside the monitoring area and starting the recording of a picked-up image at the time point.

Still another object of the present invention is to provide a monitoring system capable of automatically detecting and reporting to a supervisor that a person exits from a monitoring area to an area outside the monitoring area.

[2] A monitoring video camera is set for prevention in a convenience store, a bank, and so forth, so that an image picked up by the video camera is recorded on a VTR (Video Tape Recorder), and is made use of for criminal investigation.

In the conventional VTR, however, the whole of a monitoring area is imaged and recorded. In cases such as a case where a crime occurred, the face of a criminal recorded on the VTR cannot, in some cases, be sufficiently recognized. Even in a case where almost all of persons are absent, f or example, in the night, recording is always made on the VTR, so that a huge amount of a video tape or the like is required, and it takes long to make a search at a later time.

An object of the present invention is to provide a monitoring device capable of easily recording a face image important to specify an individual.

[3] In the place where there is no predetermined illuminance, for example, in the night, an image cannot be obtained by an imaging device such as a CCD camera. Therefore, the imaging device cannot be used as a monitoring camera for prevention. On the other hand, an infrared camera measures, on the basis of the amount of infrared rays emitted from an object, the temperature of the object, converts the temperature distribution of the object into an amount which can be recognized by a person, and outputs the amount to a monitor or the like.

The infrared camera can output, if there is an object, an image based on the quantity of heat of the object depending on emitted infrared rays irrespective of illuminance, so that it is considered that the infrared camera is utilized as a monitoring camera in the place where the CCD camera is poor at monitoring, for example, in the night.

In the above-mentioned infrared camera, however, all objects are respectively outputted as images corresponding to their quantities of heat. In order to judge whether or not the image is a person, an operator must make the judgment by observing the monitor or the like, resulting in band operability.

An object of the present invention is to provide a monitoring device capable of easily doing monitoring even in the place where there is no illuminance, for example, in the night.

[4] When an object which is very slowly moving is imaged, for example, a plant or a living thing in the growth process, a subject has been conventionally recorded for each predetermined time period.

An object of the present invention is to provide an imaging system capable of recording a picked-up image of a subject every time the amount of movement of the subject from the previous time when the picked-up image was recorded becomes not less than a predetermined amount.

SUMMARY OF THE INVENTION

A first monitoring system according to the present invention is characterized by comprising an imaging device for imaging a monitoring area, and means for detecting information relating to the movement of an object in the monitoring area on the basis of an output of the imaging device.

It is preferable to provide means for judging whether or not somebody enters the monitoring area on the basis of the information relating to the movement of the object. It is preferable to provide reporting means for reporting, when it is judged that somebody enters the monitoring area, to a supervisor that somebody enters the monitoring area.

It is preferable to provide a recording device for recording an image picked up by the imaging device, and means for starting the recording by the recording device when it is judged that somebody enters the monitoring area.

It is preferable to provide a recording device for recording an image picked up by the imaging device, reporting means for reporting, when it is judged that somebody enters the monitoring area, to a supervisor that somebody enters the monitoring area, and means for starting the recording by the recording device when it is judged that somebody enters the monitoring area.

An entering person detecting sensor maybe provided in an entrance path of a person entering the monitoring area so that the imaging device is operated when the entering person is detected by the entering person detecting sensor. It is preferable that a power supply comprising a solar battery and a storage battery storing power obtained by the solar battery supplies the power to the imaging device.

An example of the information relating to the movement of the object is a motion vector corresponding to a detecting area or motion vectors corresponding to a plurality of detecting areas set in an imaging area of the imaging device.

The resolution of the imaging device may be a sufficiently low resolution to judge the presence or absence of the movement of the object.

A second monitoring system according to the present invention is characterized by comprising an imaging device for imaging a monitoring area, means for detecting information relating to the movement of an object in the monitoring area on the basis of an output of the imaging device, means for judging whether or not a person to be monitored exits from the monitoring area on the basis of the information relating to the movement of the object, and reporting means for reporting, when it is judged that the person to be monitored exits from the monitoring area, to a supervisor that the person to be monitored exits from the monitoring area.

A third monitoring system according to the present invention is characterized by comprising first imaging means for imaging a monitoring area, detection means for detecting the movement of an object in the monitoring area on the basis of an output of the first imaging means, and second imaging means for imaging, when the movement of the object in the monitoring area is detected,a moving portion.

An example of the second imaging means is one for enlarging the moving portion and imaging the enlarged moving portion.

The first imaging means comprises a monitoring camera for imaging the whole monitoring area, and the second imaging means comprises a close-up camera for taking a close-up of a part of the monitoring area and imaging the part whose close-up has been taken. The first imaging means and the second imaging means may be constituted by one video camera having a zoom mechanism.

There may be provided a recording device, a switch for switching an output of the first imaging means and an output of the second imaging means and feeding the output obtained by the switching to the recording device, and control means for controlling the switch such that the output of the first imaging means is fed to the recording device when the movement of the object in the monitoring area is not detected, while the output of the second imaging means is fed to the recording device when the movement of the object in the monitoring area is detected.

It is preferable that an identifier for making identification as to which of the output of the first imaging device and the output of the second imaging device is recorded is recorded by the recording device.

It is preferable to make, in reproducing an image recorded by the recording device, the speed at which an image picked up by the second imaging means is reproduced lower than the speed at which an image picked up by the first imaging means is reproduced.

There may be provided a recording device, and means for recording the output of the second imaging device by the recording device only when the movement of the object in the monitoring area is detected.

A fourth monitoring system according to the present invention is characterized by comprising detection means for detecting the movement of an object in a monitoring area by a signal change obtained on the basis of the amount of infrared rays in the monitoring area, and output means for outputting the results of the detection by the detection means.

A fifth monitoring system according to the present invention is characterized by comprising an infrared camera for receiving infrared rays emitted from an object in a monitoring area, detection means for detecting the movement of the object in the monitoring area on the basis of a signal change proportional to the intensity of the infrared rays outputted from the infrared camera, and output means for outputting the results of the detection by the detection means.

It is preferable that the fourth monitoring system or the fifth monitoring system according to the present invention is provided with a warning device, and means for driving the warning device on the basis of the output of the detection means.

It is preferable that the fourth monitoring system or the fifth monitoring system is provided with a video camera for imaging the monitoring area, and means for driving the video camera on the basis of the output of the detection means.

An imaging system according to the present invention is an imaging system for intermittently recording a picked-up image of a subject, characterized by comprising an imaging device for imaging the subject, movement amount measurement means for measuring the amount of movement of the subject from the previous time when the picked-up image was recorded on the basis of an output of the imaging device, and means for recording the picked-up image obtained by the imaging device when the amount of movement of the subject from the previous time when the picked-up image was recorded becomes not less than a predetermined amount.

There may be provided means for recording, unless the amount of movement of the subject from the previous time when the picked-up image was recorded becomes not less than a predetermined amount before a predetermined time period has elapsed since the previous time when the picked-up image was recorded, the picked-up image obtained by the imaging device at the time point where the predetermined time period has elapsed since the previous time when the picked-up image was recorded.

The foregoing and other objects, features, aspects and advantages of the present invention will become more apparent from the following detailed description of the present invention when taken in conjunction with the accompanying drawings.

DETAILED DESCRIPTION OF THE EPREFERRED EMBODIMENTS

Figure 1:
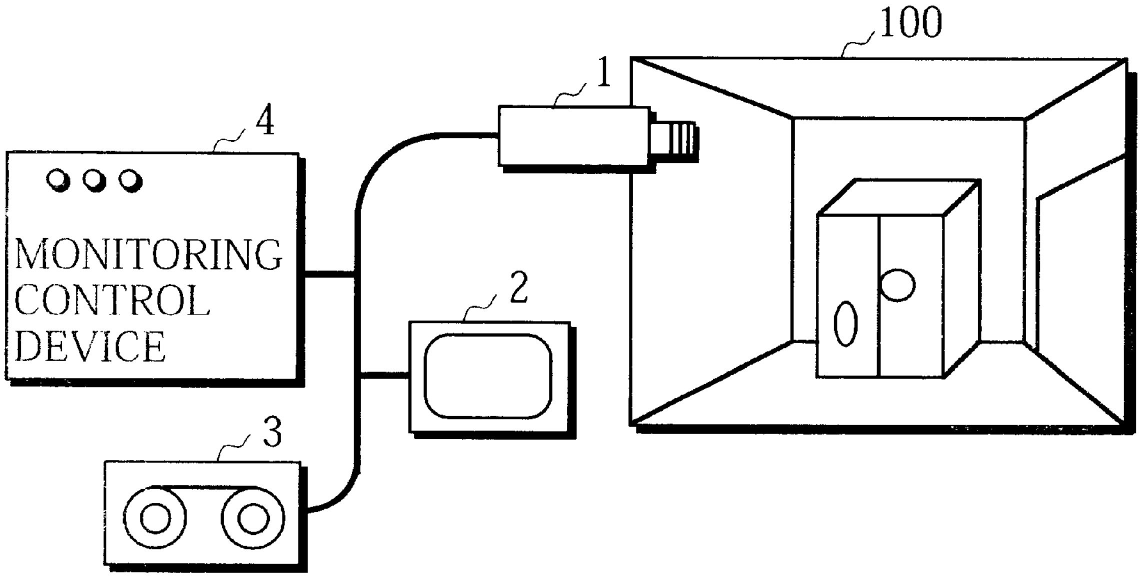
FIG. 1 is a diagram showing the schematic configuration of a first monitoring system.

Embodiments of the present invention will be described while referring to the drawings.

[1] Description of First Monitoring System

FIG. 1 illustrates the schematic configuration of a first monitoring system capable of detecting that a person enters a monitoring area from an area outside the monitoring area.

The first monitoring system comprises a video camera 1 for imaging a monitoring area 110, a monitor 2 for displaying an image picked up by the video camera 1, a recording device 3 for recording the image picked up by the video camera 1, and a monitoring control device 4.

Figure 2:
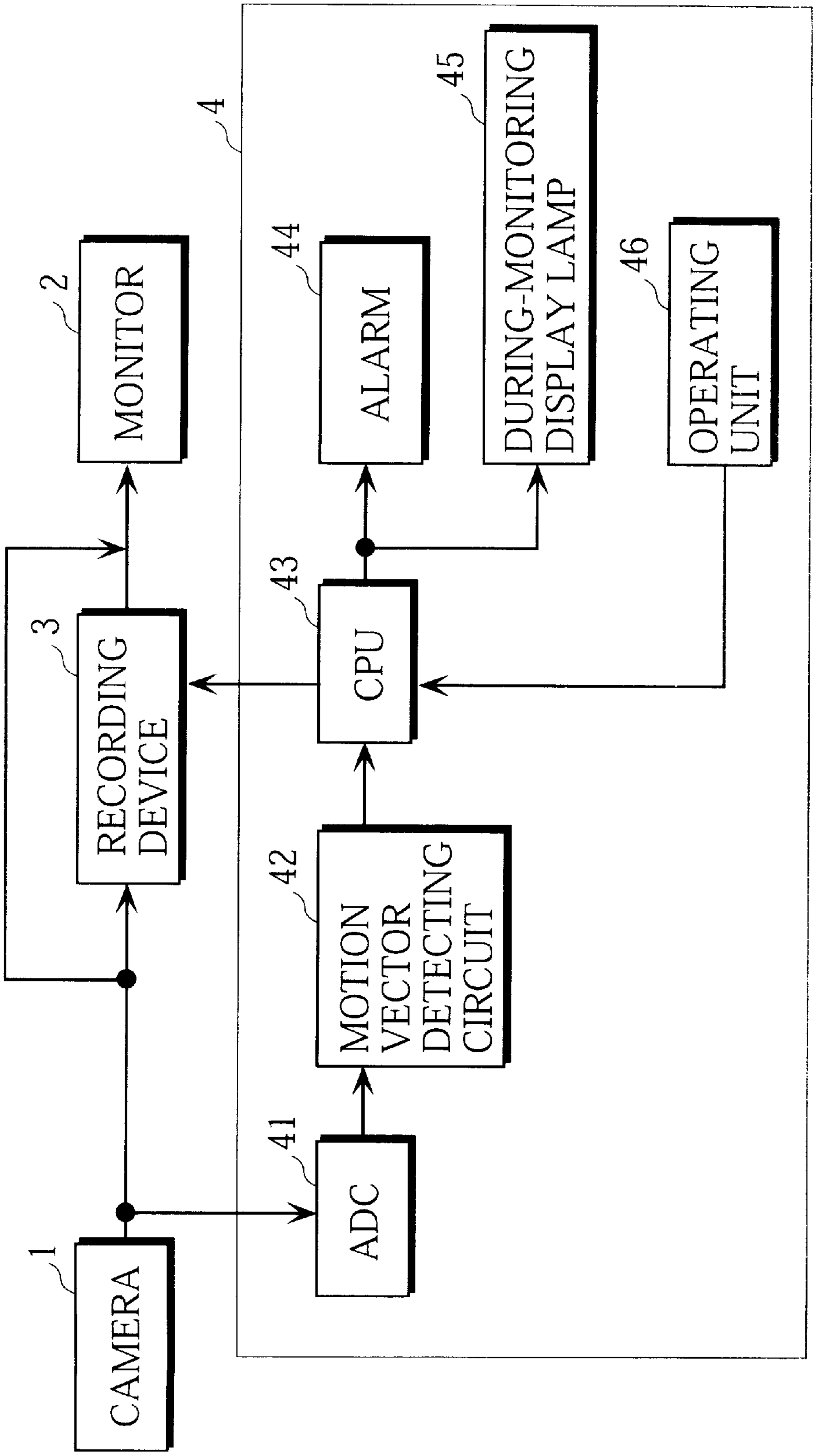
FIG. 2 is a block diagram showing the electrical configuration of the first monitoring system.

FIG. 2 illustrates the electrical configuration of the first monitoring system.

An output of the video camera 1 is fed to the monitor 2, the recording device 3, and the monitoring control device 4. The image picked up by the video camera 1 is always displayed on the monitor 2. The recording device 3 is controlled on the basis of a control signal from the monitoring control device 4.

The monitoring control device 4 comprises an analog-to-digital converter (ADC) 41, a motion vector detecting circuit 42, a CPU 43, an alarm 44, a during-monitoring display lamp 45, and an operating unit 46 The CPU 43 comprises a ROM (not shown) storing its program and the like and a RAM (not shown) storing necessary data.

The ADC 41 converts an analog image signal outputted from the video camera 1 into a digital image signal. The digital image signal outputted from the ADC 41 is fed to the motion vector detecting circuit 42.

Figure 3:
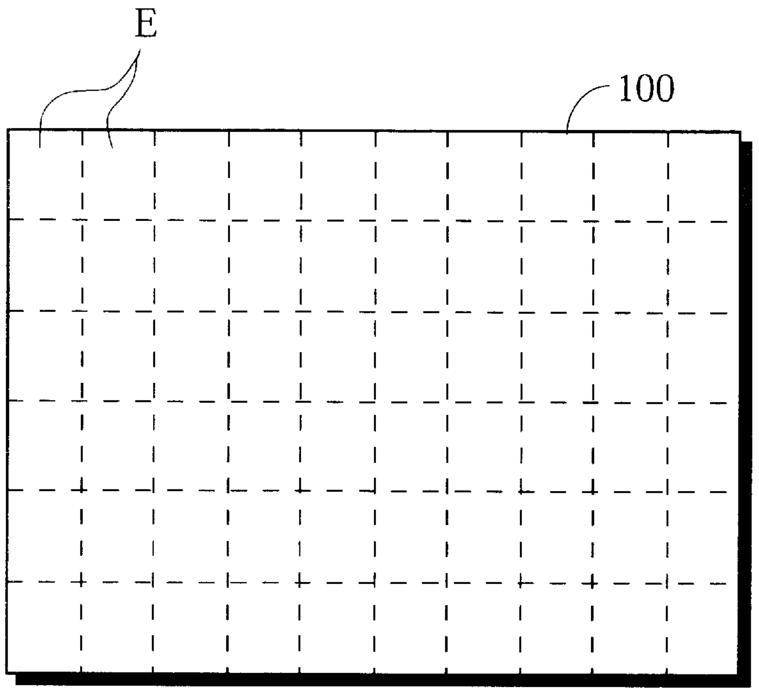
FIG. 3 is a schematic view showing a plurality of detecting areas set in a imaging area of a video camera.

The motion vector detecting circuit 42 detects for each frame motion vectors (information relating to the movement) for a plurality of detecting areas E set in an image area (a monitoring area) 100 of the video camera 1, as shown in FIG. 3, on the basis of a representative point matching method.

Figure 4:
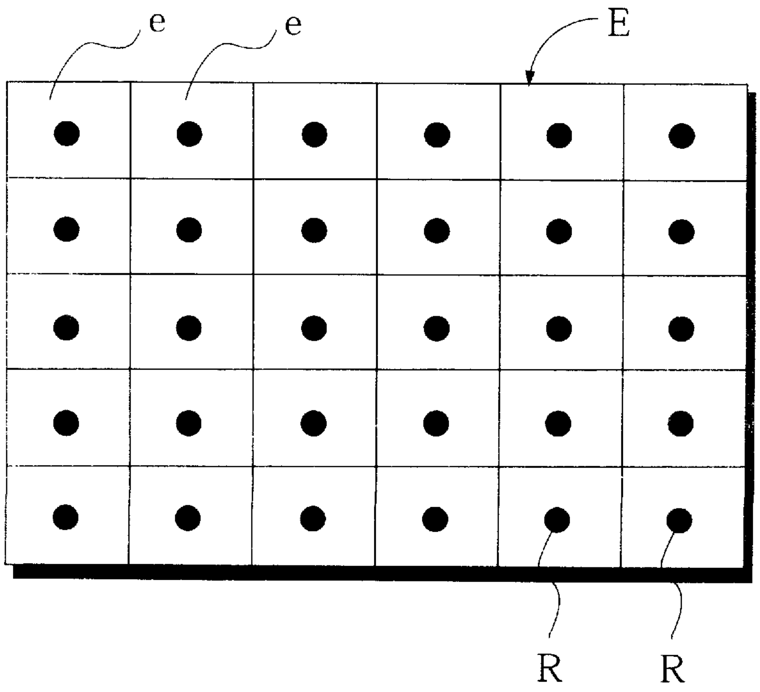
FIG. 4 is a schematic view showing a plurality of small areas in the detecting area shown in FIG. 3.
Figure 5:
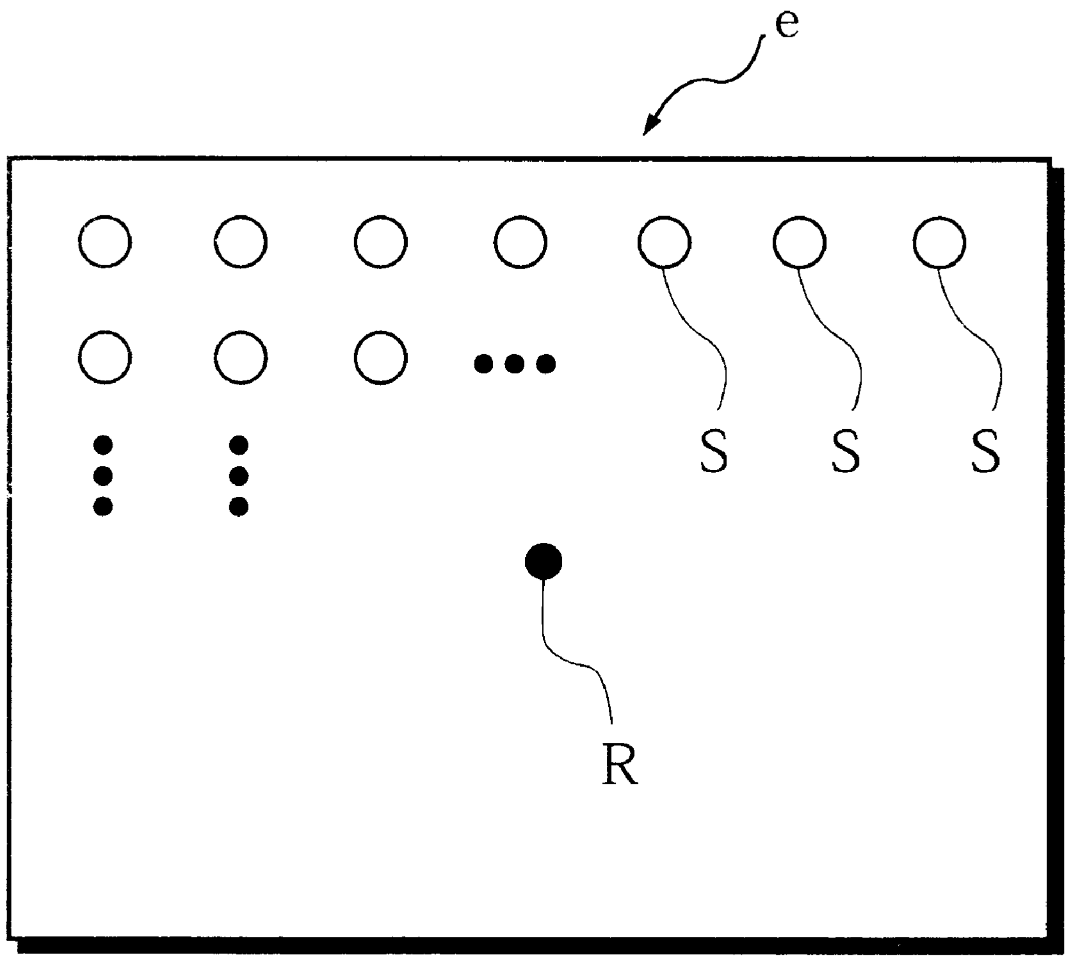
FIG. 5 is a schematic view showing a plurality of sampling points and one representative point which are set in the small area shown in FIG. 4.

More specifically, each of the detecting areas E is further divided into a plurality of small areas e, as shown in FIG. 4. As shown in FIG. 5, a plurality of sampling points S and one representative point R are set in each of the small areas e.

A difference between the image signal level at each of the sampling points S in the small area e in the current frame and the image signal level at the representative point R in a corresponding small area e in the preceding frame, that is, a correlated value at each of the sampling points is found for each of the detecting areas E. For each of the detecting areas E, the sum of correlated values at the sampling points S which are the same in deviation from the representative points R in all the small areas e in the detecting area E is found (a value obtained is hereinafter referred to as an accumulated correlated value). Consequently, accumulated correlated values whose number corresponds to the number of the sampling points S in one of the small areas e are found for each of the detecting areas E.

Deviation of the sampling point S having the minimum accumulated correlated value, that is, having the highest correlation in each of the detecting areas E is extracted as a motion vector (the movement of an object) in the detecting area E.

Figure 6B:
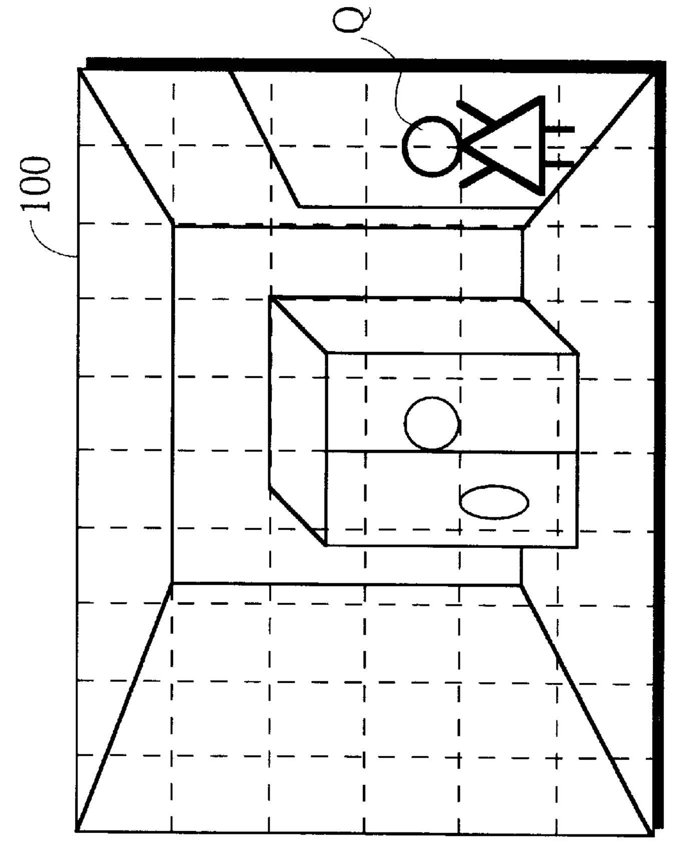
FIGS. 6*a* and 6*b* are schematic views respectively showing a picked-up image in a case where no person enters a monitoring area and a picked-up image in a case where a person enters the monitoring area.
Figure 6A:
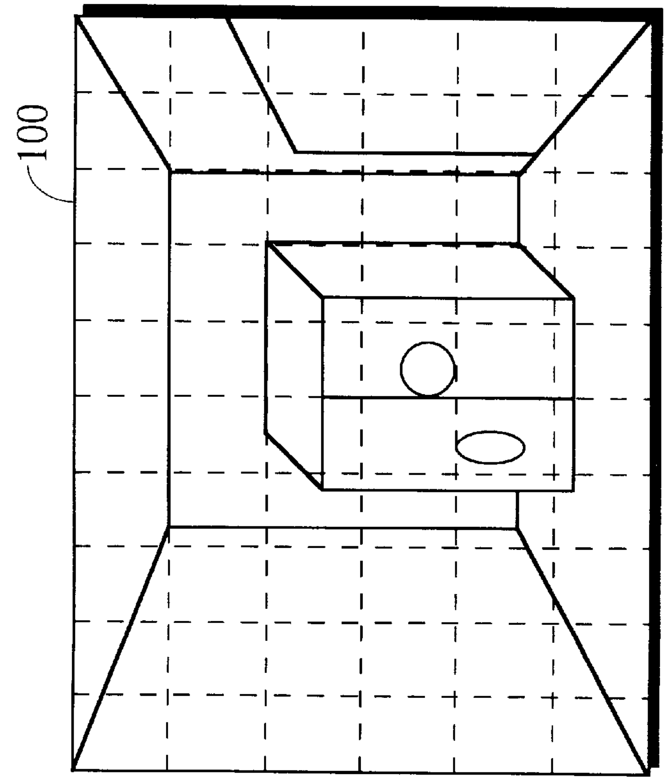
Figure 7B:
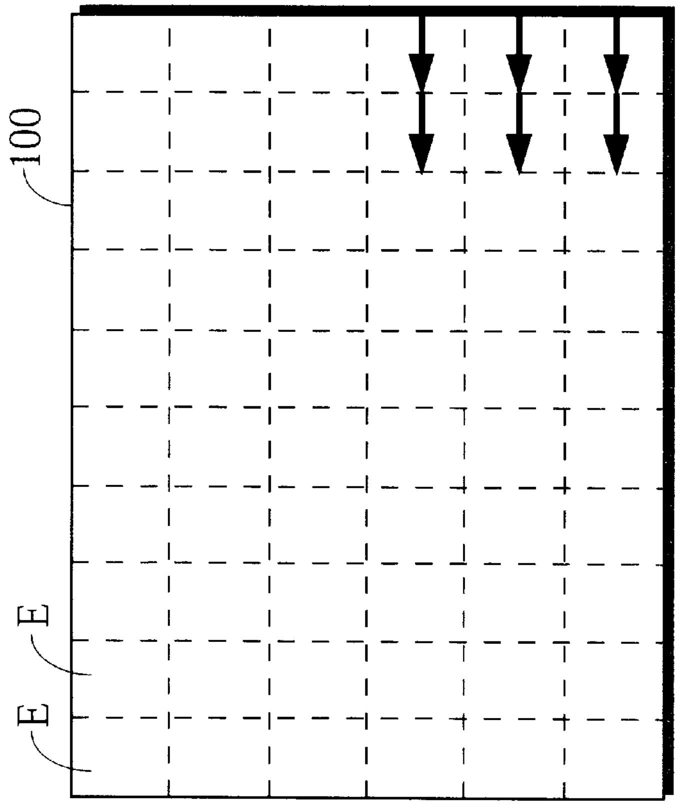
FIGS. 7*a* and 7*b* are schematic views respectively showing a motion vector in each of detecting areas in a case where no person enters a monitoring area and a motion vector in each of the detecting areas in a case where a person enters the monitoring area.
Figure 7A:
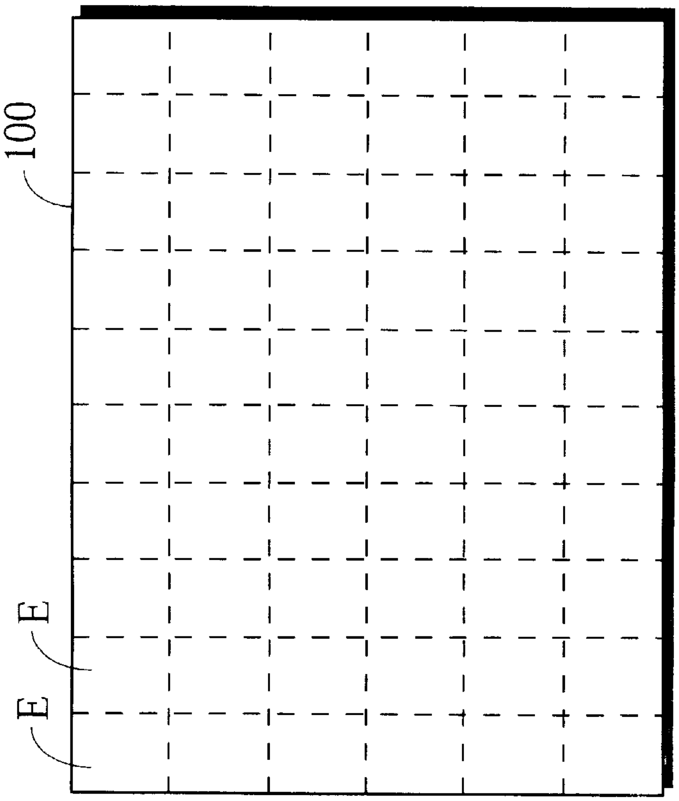

When no person enters the monitoring area 100 as shown in FIG. 6*a*, the magnitude of a motion vector in each of the detecting areas E is less than a predetermined value as shown in FIG. 7*a*. When a person enters the monitoring area 100 as shown in FIG. 6*b*, the magnitude of a motion vector in the detecting area E on which an entering person Q is projected is not less than the predetermined value as shown in FIG. 7*b*.

A motion vector for each of the detecting areas E which is detected by the motion vector detecting circuit 42 is fed to the CPU 43. The CPU 43 performs entrance monitoring processing on the basis of the motion vectors for the detecting areas E which are inputted for each frame.

Figure 8:
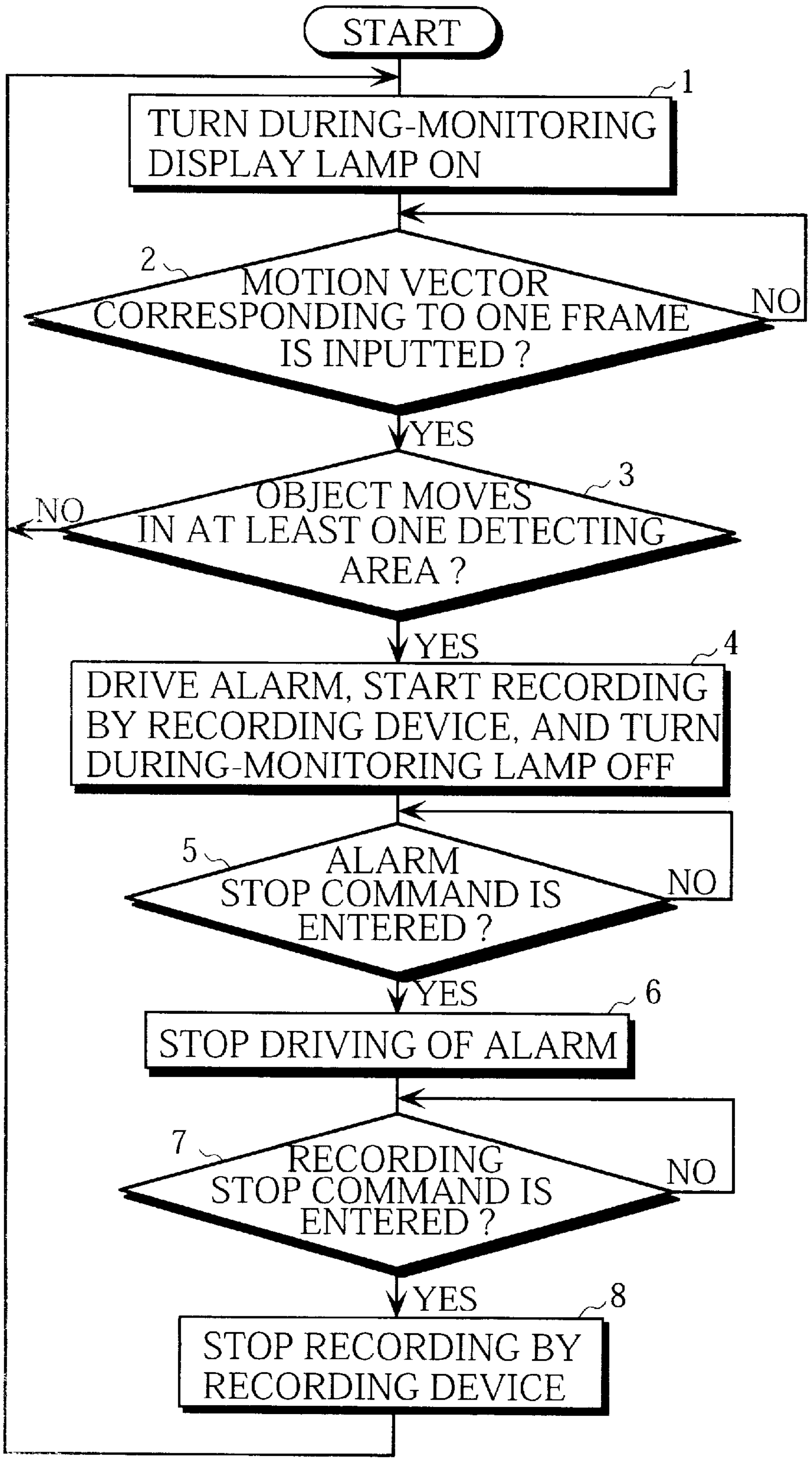
FIG. 8 is a flow chart showing the procedure for entrance monitoring processing.

FIG. 8 shows the procedure for entrance monitoring processing performed by the CPU 43. The entrance monitoring processing shown in FIG. 8 is processing effective in detecting an entering person such as a thief, to report the entering person to a supervisor.

The during-monitoring display lamp 45 is first turned on (step 1). When motion vectors, which correspond to one frame, for the respective detecting areas E are inputted (step 2), it is judged whether or not an object moves in at least one of the detecting areas E (step 3).

When it is judged that the object does not move in any of the detecting areas E (NO at step 3), the program is returned to the step 1. Consequently, the processing at the steps 1, 2 and 3 is always repeatedly performed.

When it is judged at the step 3 that the object moves in at least one of the detecting areas E, it is judged that a person enters the monitoring area, so that the alarm 44 is driven to report to the supervisor that a person enters the monitoring area, and recording by the recording device 3 is started to record the person entering the monitoring area (step 4). Further, the during-monitoring display lamp 45 is turned off.

Thereafter, when the supervisor enters an alarm stop command using the operating unit 46 (YES at step 5), the driving of the alarm 44 is stopped (step 6).

When the supervisor enters a recording stop command using the operating unit 46 (YES at step 7), the recording by the recording device 3 is stopped (step 8). The program is returned to the step 1.

Figure 9:
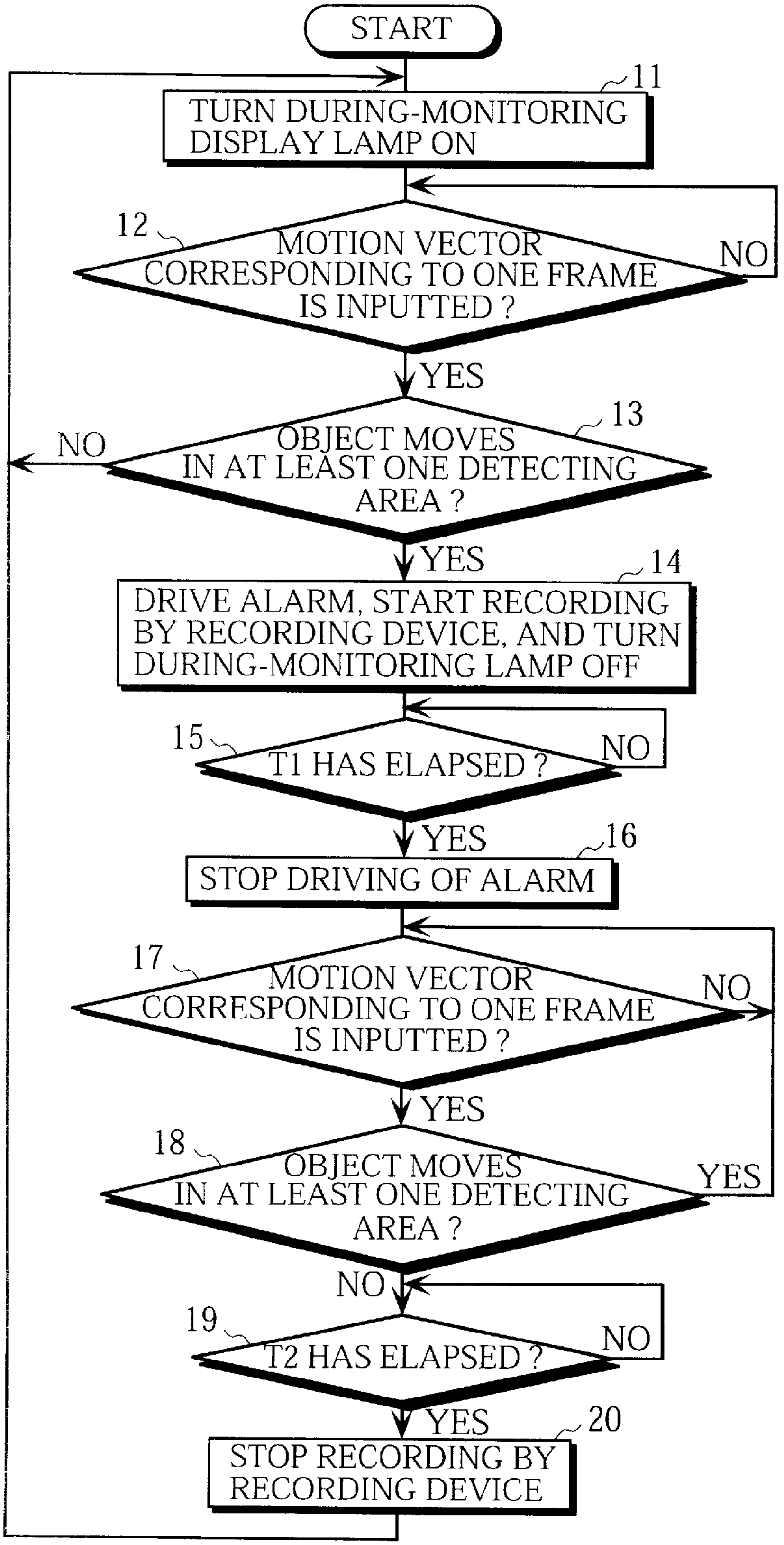
FIG. 9 is a flow chart showing another example of entrance monitoring processing.

FIG. 9 shows the procedure for another entrance monitoring processing performed by the CPU 43. The entrance monitoring processing shown in FIG. 9 is processing effective in detecting and reporting to the supervisor in a store or the like that a customer visited the store, and causing the supervisor to check the customer.

The during-monitoring display lamp 45 is first turned on (step 11). When motion vectors, which correspond to one frame, for the respective detecting areas E are inputted (step 12), it is judged whether or not an object moves in at least one of the detecting areas E (step 13).

When it is judged that the object does not move in any of the detecting areas E (NO at step 13), the program is returned to the step 11. Consequently, the processing at the steps 11, 12 and 13 is always repeatedly performed.

When it is judged at the step 13 that the object moves in at least one of the detecting areas E, it is judged that a person enters the monitoring area, so that the alarm 44 is driven to report to the supervisor that a person enters the monitoring area, and recording by the recording device 3 is started to record the person entering the monitoring area (step 14). Further, the during-monitoring display lamp 45 is turned off.

Thereafter, when a predetermined time period T1, for example, 10 seconds has elapsed (YES at step 15), the driving of the alarm 44 is stopped (step 16) Thereafter, when the motion vectors, which correspond to one frame, for the respective detecting areas E are inputted (step 17), it is judged whether or not the object moves in at least one of the detecting areas E (step 18) When the object moves in at least one of the detecting areas E, the program is returned to the step 17. Until it is judged at the step 18 that the object does not move in any of the detecting areas E, the processing at the steps 17 and 18 is repeated.

When it is judged at the step 18 that the object does not move in any of the detecting areas E, it is judged that the person entering the monitoring area exits from the monitoring area. Thereafter, the recording by the recording device 3 is stopped (step 20) after an elapse of a predetermined time period T2, for example, one minute (step 20). The program is returned to the step 11.

[2] Description of Second Monitoring System

Figure 10:
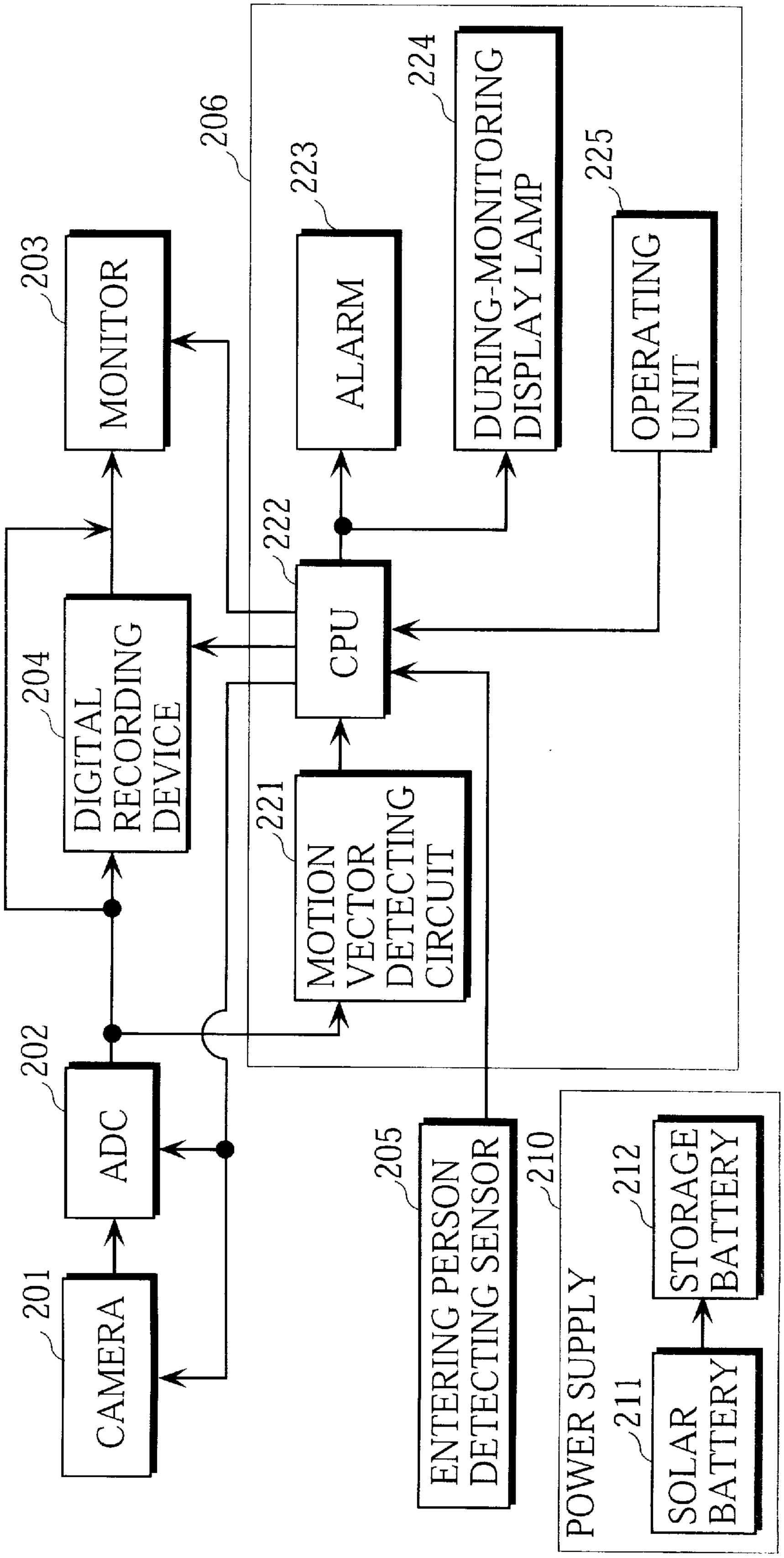
FIG. 10 is a block diagram showing the electrical configuration of a second monitoring system.

FIG. 10 illustrates the electrical configuration of a second monitoring system capable of detecting that a person enters a monitoring area from an area outside the monitoring area.

The second monitoring system comprises a video camera 201 for imaging a monitoring area 100, an analog-to-digital converter (ADC) 202 for converting an image signal outputted from the video camera 201 into a digital signal, a monitor 203 for displaying an image picked up by the video camera 201 on the basis of the digital signal obtained by the ADC 202, a digital recording device 204 for recording the digital signal obtained by the ADC 202, an entering person detecting sensor 205 arranged in a place which is expected to be the entrance of an entrance path to the monitoring area 100, a monitoring control device 206, and a power supply 210 for supplying power of each of the devices.

An example of the digital recording device 204 is one for recording the digital signal on an optical disk device such as an MO (Magneto-Optic) or a CDR (Compact Disc-Recordable). An example of the entering person detecting sensor 205 is a photoelectric detector or a magnetometric sensor. An example of the power supply 210 is one comprising a solar battery 211 and a storage battery 212 storing power obtained by the solar battery 211.

The monitoring control device 206 comprises a motion vector detecting circuit 221, a CPU 222, an alarm 223, a during-monitoring display lamp 224, and an operating unit 225. An output of the entering person detecting sensor 205 is inputted to the CPU 222. The CPU 222 carries out the on-off control of the power supplies of the video camera 201, the ADC 202 and the monitor 203, and controls a recording operation of the digital recording device 204.

Although in the second monitoring system, power is always supplied to the entering person detecting sensor 205 and the monitoring control device 206 from the power supply 210, the power supplies of the video camera 201, the ADC 202 and the monitor 203 are turned off.

Figure 11:
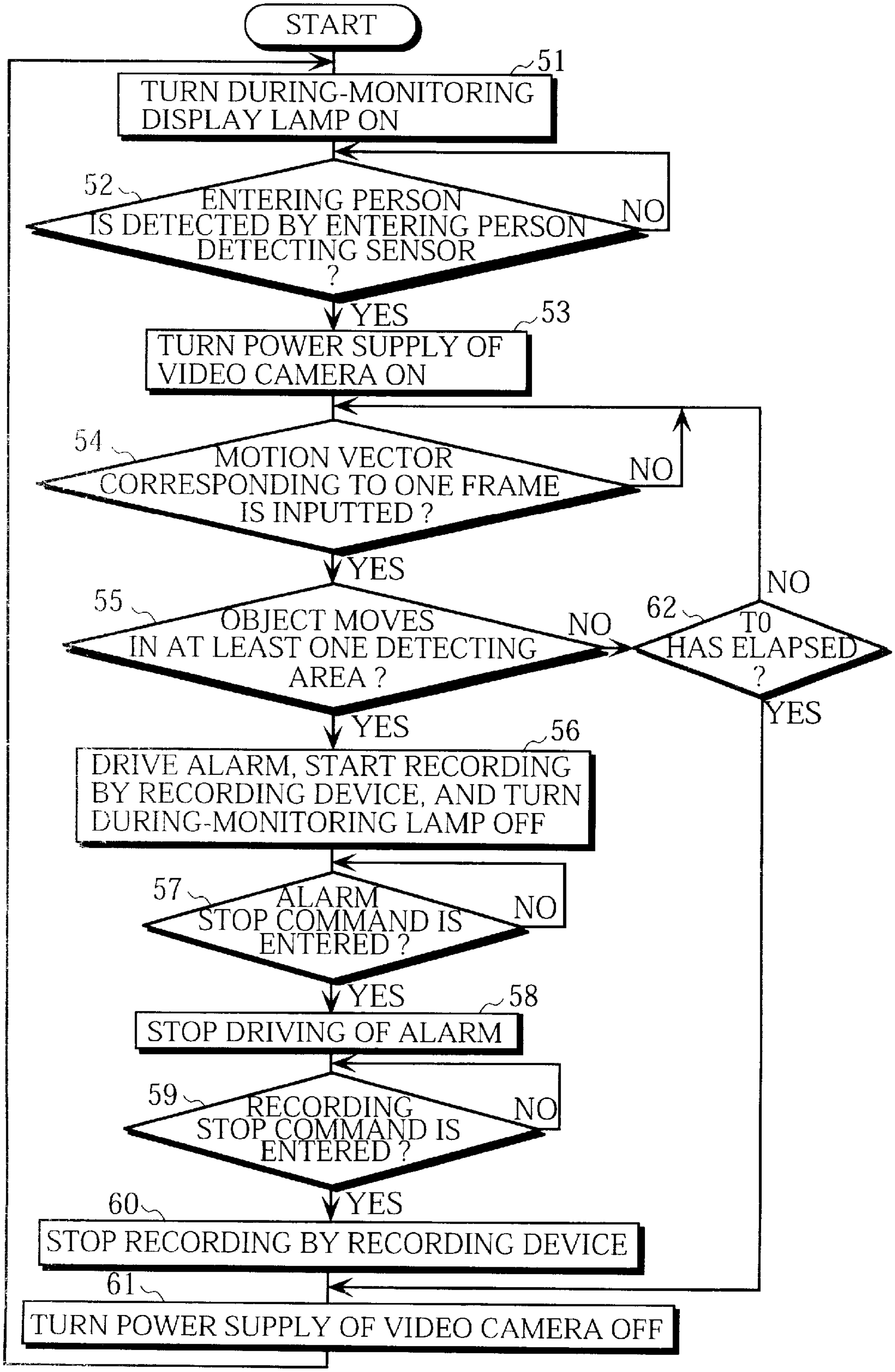
FIG. 11 is a flow chart showing the procedure for entrance monitoring processing.

FIG. 11 shows the procedure for entrance monitoring processing performed by the CPU 222.

The during-monitoring display lamp 224 is first turned on (step 51). The CPU 222 waits until an entering person is detected by the entering person detecting sensor 205 (step 52). When the entering person is detected by the detecting sensor 205, the power supplies of the video camera 201, the ADC 202 and the monitor 203 are turned on (step 53).

Thereafter, when motion vectors, which correspond to one frame, for respective detecting areas E are inputted (step 54), it is judged whether or not an object moves in at least one of the detecting areas E (step 55).

When it is judged that the object does not move in any of the detecting areas E (NO at step 55), it is judged whether or not a predetermined time period T0 (for example, five minutes) has elapsed since the power supply of the video camera 201 was turned on at the foregoing step 53 (step 62). Unless the predetermined time period T0 has elapsed since the power supply of the video camera 201 was turned on, the program is returned to the step 54. The processing at the steps 54, 55 and 62 is repeated.

When the answer is in the affirmative at the step 62 after the processing at the steps 54, 55 and 62 is repeated, that is, when the movement of the object is not detected until the predetermined time period T0 has elapsed since the power supply of the video camera 201 was turned on, the power supplies of the video camera 201, the ADC 202 and the monitor 203 are turned off (step 61). The program is returned to the step 51.

When it is judged at the step 55 that the object moves in at least one of the detecting areas E, it is judged that a person enters the monitoring area, so that the alarm 223 is driven to report to a supervisor that a person enters the monitoring area, and recording by the recording device 204 is started to record the person entering the monitoring area (step 56). Further, the during-monitoring display lamp 224 is turned off.

Thereafter, when the supervisor enters an alarm stop command using the operating unit 225 (YES at step 57), the driving of the alarm 223 is stopped (step 58)

When the supervisor enters a recording stop command using the operating unit 225 (YES at step 59), the recording by the recording device 204 is stopped (step 60). The power supplies of the video camera 201, the ADC 202 and the monitor 203 are turned off (step 61). The program is returned to the step 51.

Figure 12:
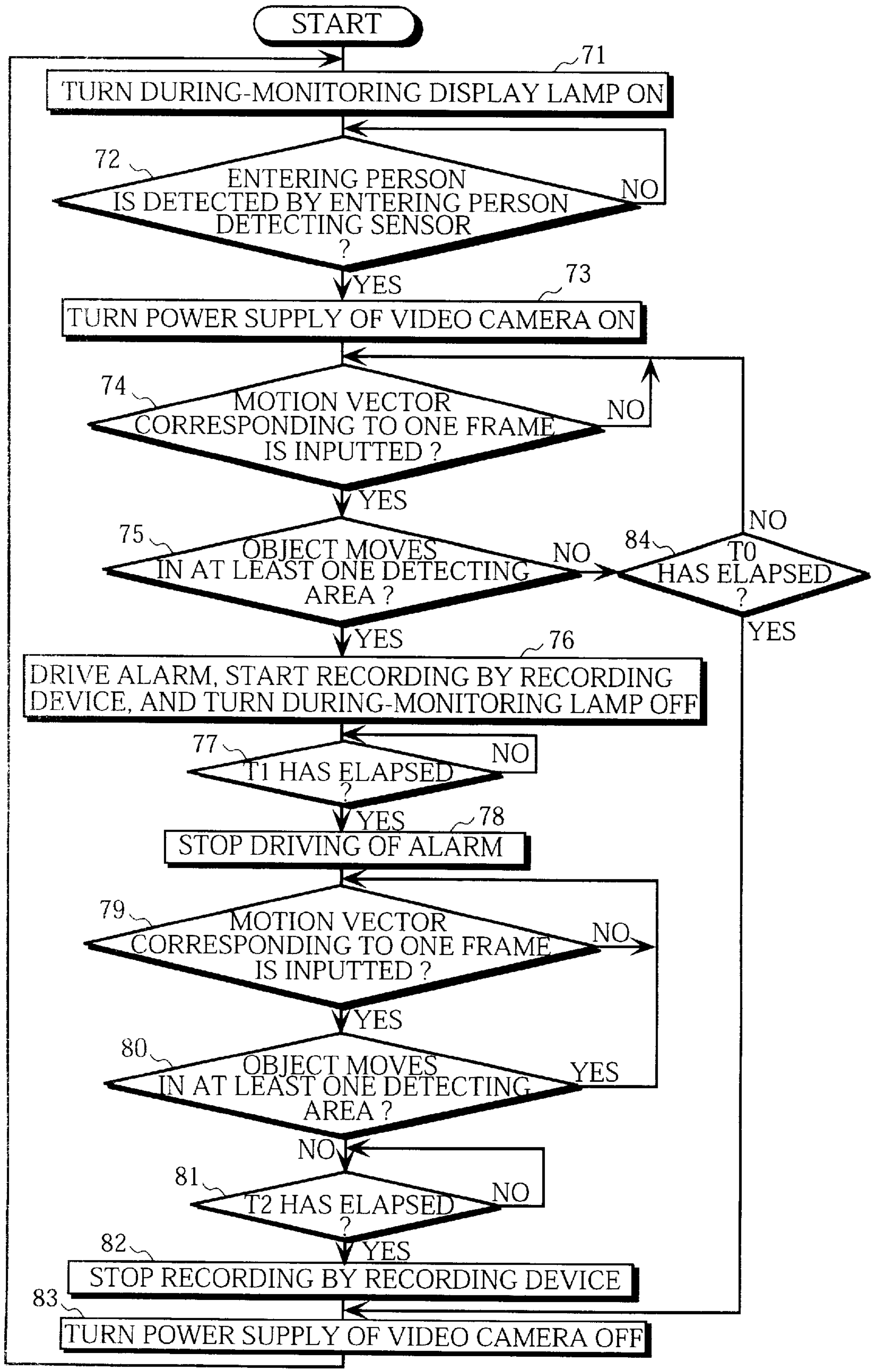
FIG. 12 is a flow chart showing another example of entrance monitoring processing.

FIG. 12 shows the procedure for another entrance monitoring processing performed by the CPU 222.

The during-monitoring display lamp 224 is first turned on (step 71). The CPU 222 waits until an entering person is detected by the entering person detecting sensor 205 (step 72). When the entering person is detected by the detecting sensor 205, the power supplies of the video camera 201, the ADC 202 and the monitor 203 are turned on (step 73).

Thereafter, when motion vectors, which correspond to one frame, for the respective detecting areas E are inputted (step 74), it is judged whether or not an object moves in at least one of the detecting areas E (step 75).

When it is judged that the object does not move in any of the detecting areas E (NO at step 75), it is judged whether or not a predetermined time period T0 (for example, five minutes) has elapsed since the power supply of the video camera 201 was turned on at the foregoing step 73 (step 84). Unless the predetermined time period T0 has elapsed since the power supply of the video camera 201 was turned on, the program is returned to the step 74. The processing at the steps 74, 75 and 84 is repeated.

When the answer is in the affirmative at the step 84 after the processing at the steps 74, 75 and 84 is repeated, that is, when the movement of the object is not detected until the predetermined time period T0 has elapsed since the power supply of the video camera 201 was turned on, the power supplies of the video camera 201, the ADC 202 and the monitor 203 are turned off (step 83). The program is returned to the step 71.

When it is judged at the step 75 that the object moves in at least one of the detecting areas E, it is judged that a person enters the monitoring area, so that the alarm 223 is driven to report to a supervisor that a person enters the monitoring area, and recording by the recording device 204 is started to record the person entering the monitoring area (step 76). Further, the during-monitoring display lamp 224 is turned off.

Thereafter, when a predetermined time period T1, for example, 10 seconds has elapsed (YES at step 77), the driving of the alarm 223 is stopped (step 78).

Thereafter, when motion vectors, which correspond to one frame, for the respective detecting areas E are inputted (step 79), it is judged whether or not the object moves in at least one of the detecting areas E (step 80). When the object moves in at least one of the detecting areas E, the program is returned to the step 79. Until it is judged at the step 80 that the object does not move in any of the detecting areas E, the processing at the steps 79 and 80 is repeated.

When it is judged at the step 80 that the object does not move in any of the detecting areas E, it is judged that the person entering the monitoring area exits from the monitoring area. Thereafter, the recording by the recording device 204 is stopped (step 82) after an elapse of a predetermined time period T2, for example, one minute (step 81). The power supplies of the video camera 201, the ADC 202 and the monitor 203 are turned off (step 83). The program is returned to the step 71. While the power supply of the video camera 210 is being turned on, the power supply of the entering person detecting sensor 205 may be turned off.

According to the above-mentioned second monitoring system, it is possible to monitor the entrance of a person from a gate, a wall, etc. around a house, for example, by the entering person detecting sensor 205, and monitor the entrance of the person into the house using the video camera 201.

In the above-mentioned second monitoring system, the power supply of the video camera 201 is not always turned on, and the power supply of the video camera 201 is turned on when an entering person is detected by the entering person detecting sensor 205, so that the power consumption can be reduced.

Since the power of the whole system is supplied by the power supply 210 comprising the solar battery 211 and the storage battery 212, the entrance can be monitored even in a monitoring area to which no power is usually supplied.

When the digital recording device is used as in the above-mentioned second monitoring system, there are advantages that follow, as compared with an analog recording device such as a VTR. That is, the digital recording device can record, in addition to image information, information for retrieving an image represented by the image information, for example, a motion vector of the image, so that a desired image is easy to retrieve. Further, the speed for retrieval is high. When a recorded image is transmitted to a monitoring chamber, and is displayed or recorded in the monitoring chamber, it is possible to make digital transmission. Therefore, the recorded image is hardly degraded by the transmission, so that it is possible to more clearly display or record the image. Since the retrieval is easy, and the image is hardly degraded by the transmission and the recording, as described above, it is easy to extract only an important part of the recorded image to produce a database.

[3] Description of Third Monitoring System

Figure 13:
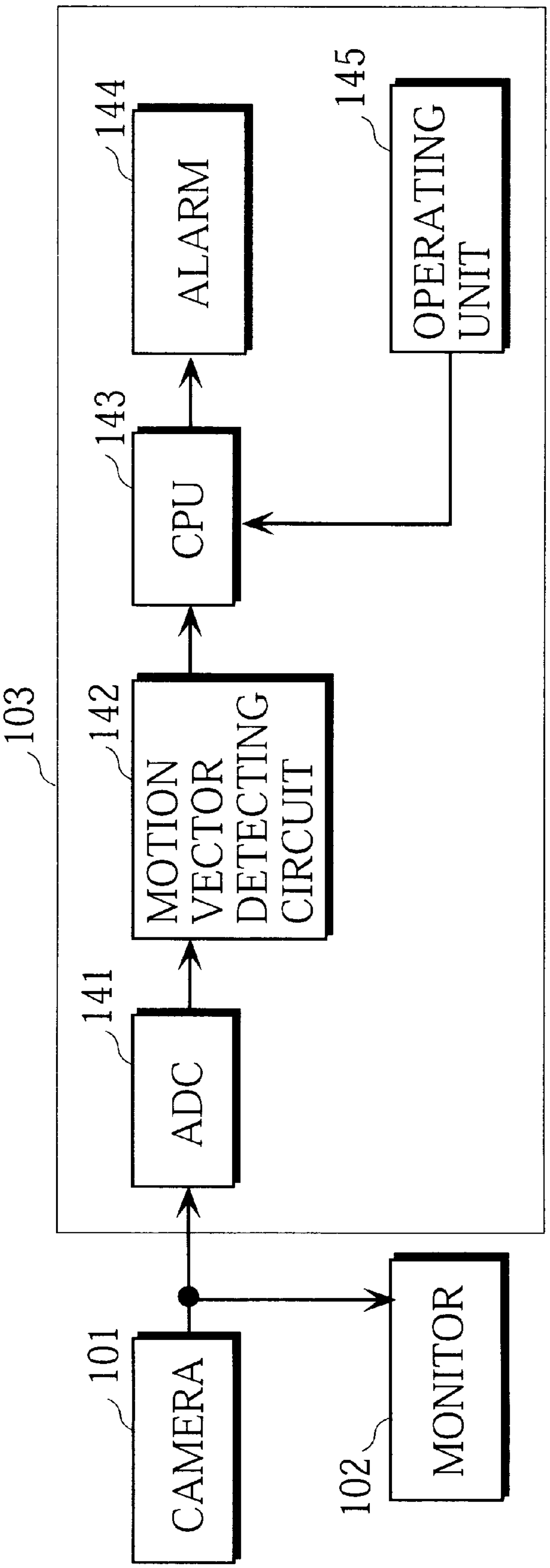
FIG. 13 is a block diagram showing the electrical configuration of a third monitoring system.

FIG. 13 is the schematic configuration of a third monitoring system capable of detecting that a person exits from a monitoring area to an area outside the monitoring area.

The third monitoring system comprises a video camera 101 for imaging the monitoring area, a monitor 102 for displaying an image picked up by the video camera 101, and a monitoring control device 103.

An output of the video camera 101 is fed to the monitor 102 and the monitoring control device 103. The image picked up by the video camera 101 is always displayed on the monitor 102.

The monitoring control device 103 comprises an analog-to-digital converter (ADC) 141, a motion vector detecting circuit 142, a CPU 143, an alarm 144, and an operating unit 145. The CPU 143 comprises a ROM (not shown) storing its program and the like and a RAM (not shown) storing necessary data.

The ADC 141 converts an analog image signal outputted from the video camera 101 into a digital image signal. The digital image signal outputted from the ADC 141 is fed to the motion vector detecting circuit 142.

The motion vector detecting circuit 142 detects for each frame motion vectors for a plurality of detecting areas E set in an image area (a monitoring area) 100 of the video camera 101, as shown in FIG. 3, on the basis of a representative point matching method, similarly to the motion vector detecting circuit 42 shown in FIG. 2.

The motion vector for each of the detecting areas E which has been detected by the motion vector detecting circuit 142 is fed to the CPU 143. The CPU 143 performs exist monitoring processing on the basis of the motion vectors for the detecting areas E which are inputted for each frame.

The exit monitoring processing is processing effective in detecting and reporting to a supervisor that a person to be monitored such as a child exits from the monitoring area 100. The outline of the exit monitoring processing will be described.

Figure 14:
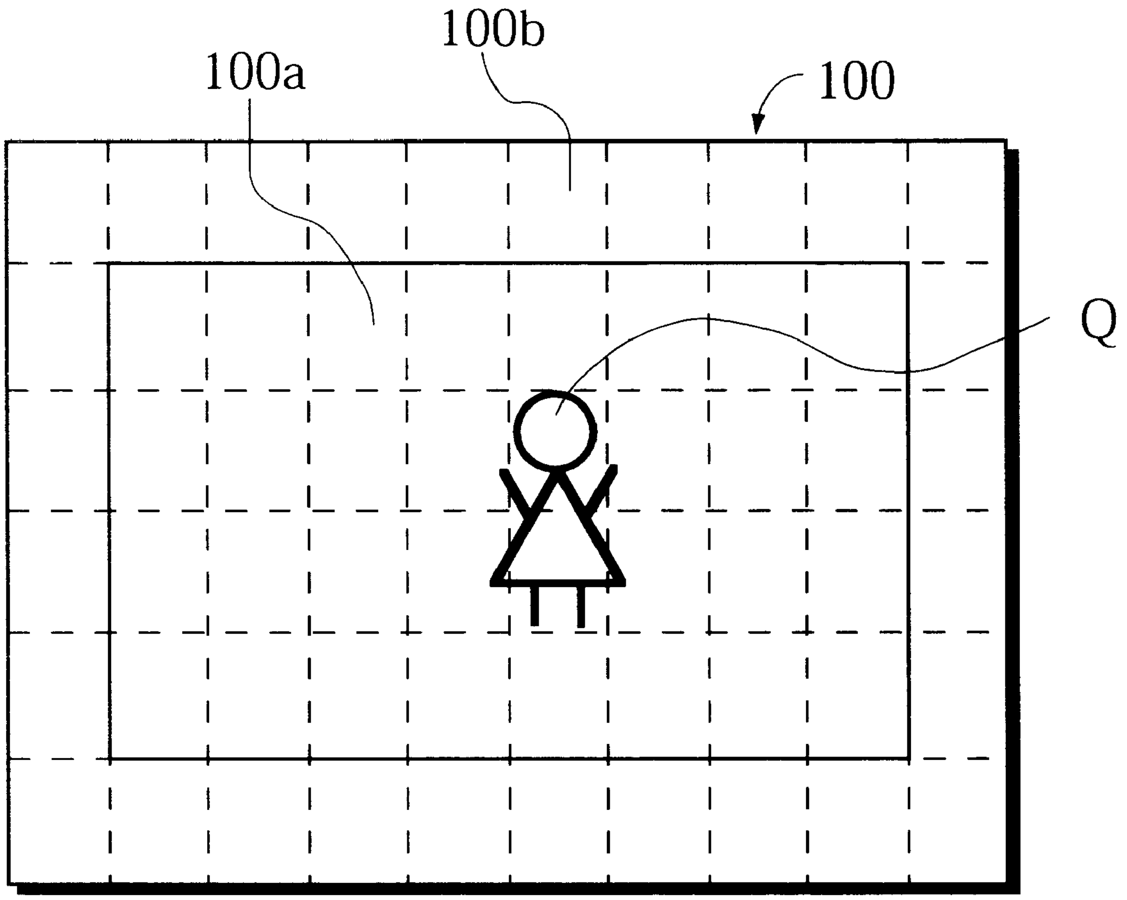
FIG. 14 is a schematic view showing an inner area and an outer area which are set in a monitoring area.

As shown in FIG. 14, an inner area **100*a* and an outer area 100*b* are set in the monitoring area 100. In FIG. 14**, Q denotes a person to be monitored.

Figures 15A, 15B, 15C:
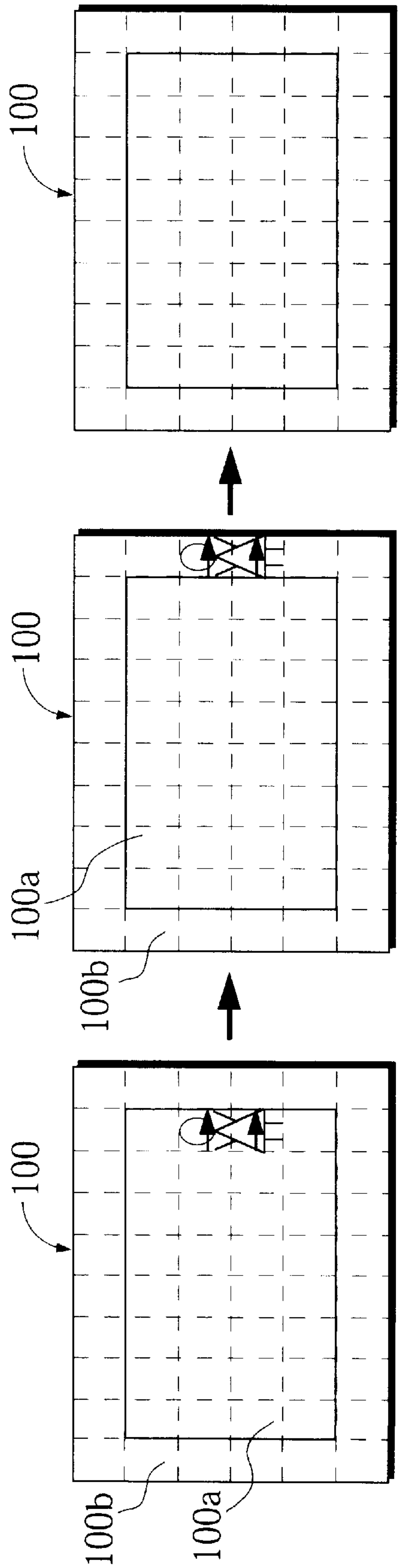
FIGS. 15*a*, 15*b* and 15*c* are schematic views for explaining the outline of exit monitoring processing.

When the person to be monitored which exists in the inner area **100*a* exits from the monitoring area 100, a state where the person to be monitored Q exists in the inner area 100*a* (FIG. 15*a*)', a state where the person to be monitored Q exists in the outer area 100*b* (FIG. 15*b*), and a state where the person to be monitored Q does not exist in the monitoring area 100 (FIG. 15*c*) arise in this order, respectively, as shown in FIGS. 15*a*, 15*b*, and FIG. 15*c***.

When the person to be monitored Q exists in the inner area **100*a* as shown in FIG. 15*a*, the movement is detected in the detecting area E in the inner area 100*a*. When the person to be monitored Q exists in the outer area 100*b* as shown in FIG. 15*b*, the movement is not detected in the detecting area E in the inner area 100*a*, while being detected in the detecting area E in the outer area 100*b*. When the person to be monitored Q does not exist in the monitoring area 100 as shown in FIG. 15*c*, the movement is not detected in the detecting areas E in both the inner area 100*a* and the outer area 100*b***.

Figure 16:
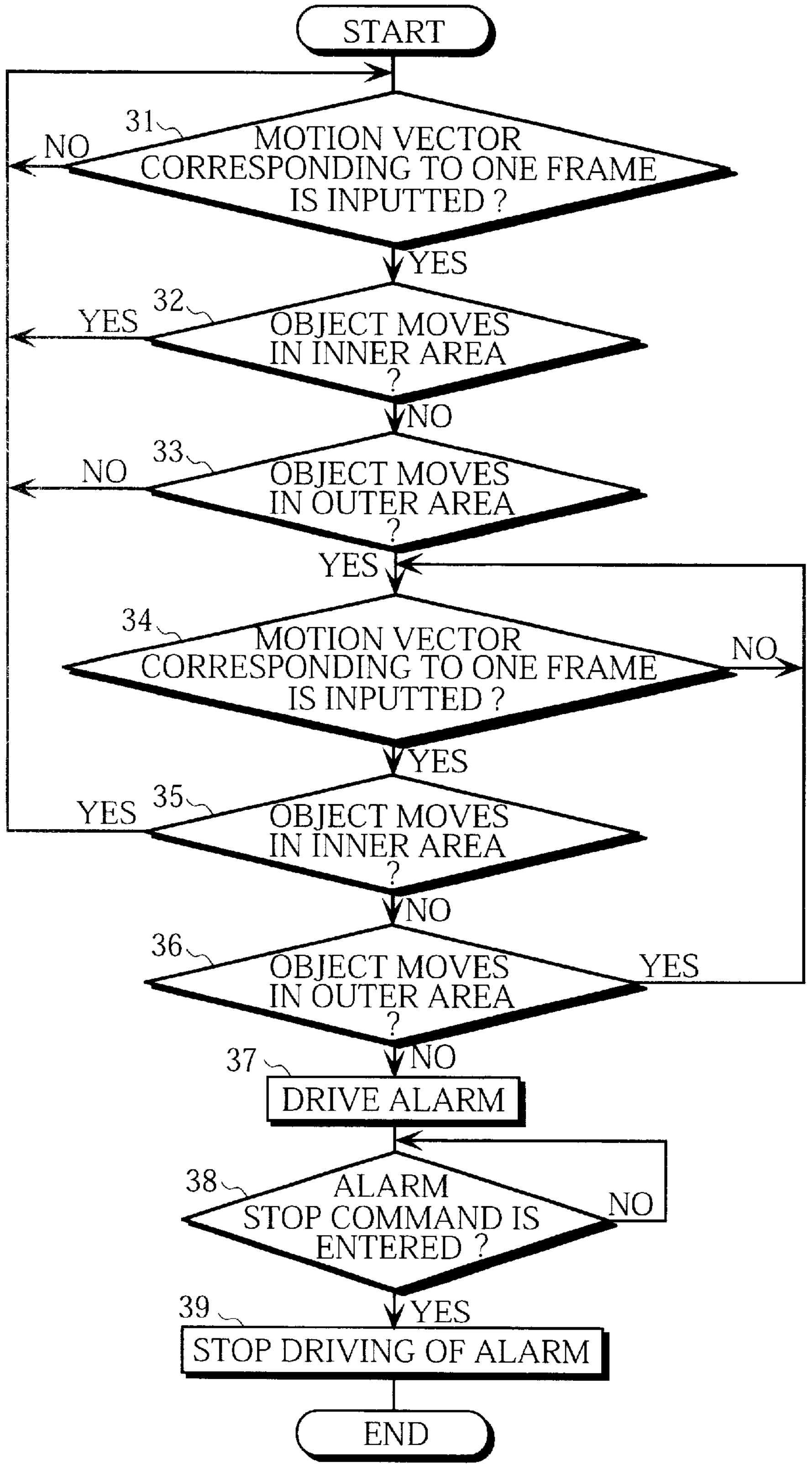
FIG. 16 is a flow chart showing the procedure for exit monitoring processing.

FIG. 16 shows the procedure for exit monitoring processing performed by the CPU 143.

When motion vectors, which correspond to one frame, for the respective detecting areas E are inputted (step 31), it is judged whether or not an object moves in the inner area 100*a* (step 32).

When the object moves in the inner area 100*a*, the program is returned to the step 31. Consequently, the processing at the steps 31 and 32 is always repeatedly performed.

When it is judged at the step 32 that the object does not move in the inner area 100*a*, it is judged whether or not the object moves in the outer area 100*b* (step 33).

When the object does not move in the outer area 100*b* at the step 33, the program is returned to the step 31. When it is judged at the step 33 that the object moves in the outer area 100*b*, the CPU 222 waits until the motion vectors, which correspond to one frame, for the respective detecting areas E are inputted (step 34). When the motion vectors, which correspond to one frame, for the respective detecting areas E are inputted, it is judged whether or not the object moves in the inner area 100*a* (step 35).

When it is judged at the step 35 that the object moves in the inner area 100*a*, it is judged that a person to be monitored is returned to the inner area 100*a* from the outer area 100*b*, after which the program is returned to the step 31.

When it is judged at the step 35 that the object does not move in the inner area 100*a*, it is judged whether or not the object moves in the outer area 100*b* (step 36) When the object moves in the outer area 100*b*, the program is returned to the step 34.

When it is judged at the step 36 that the object does not move in the outer area 100*b*, it is judged that the person to be monitored exits from the monitoring area 100, so that the alarm 144 is driven (step 37).

Thereafter, when the supervisor enters an alarm stop command using the operating unit 145 (YES at step 38), the driving of the alarm 144 is stopped (step 39). The current exit monitoring processing is terminated.

In each of the first to third monitoring systems, it is detected that a person enters the monitoring area or exits from the monitoring area by automatically detecting the movement of an object from the picked-up image. Therefore, it is possible to use a video camera having a lower resolution, as compared with a video camera used in a conventional monitoring system. Such detection precision that the presence or absence of the movement can be judged is sufficient. When it is not necessary to specify an entering person (when a precise image is not required), therefore, a low-cost system can be constructed. Moreover, if a lot of simple video cameras of this type are used, a system capable of monitoring a lot of points can be manufactured at low cost.

[4] Description of Fourth Monitoring System

Figure 17:
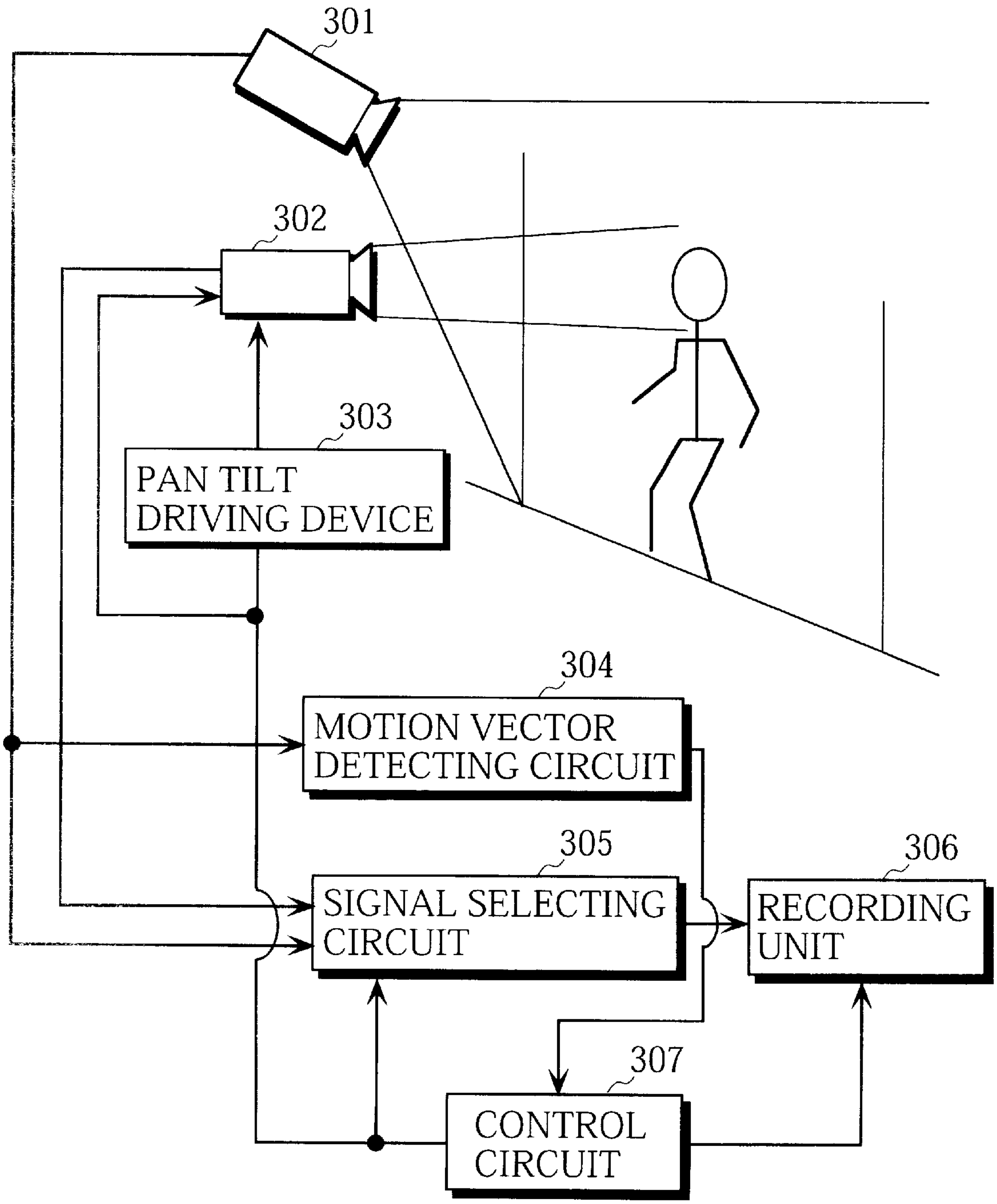
FIG. 17 is a block diagram showing the electrical configuration of a fourth monitoring system.

FIG. 17 illustrates the schematic configuration of a fourth monitoring system.

The fourth monitoring system comprises a monitoring video camera 301 for imaging the whole of a monitoring area, and a close-up video camera 302 for taking a close-up of the face of a person entering the monitoring area and imaging the face whose close-up has been taken.

The monitoring area is monitored by the monitoring video camera 301. The close-up video camera 302 is moved upward and downward and rightward and leftward by a pan tilt driving device 303, so that the close-up video camera 302 is directed toward the face of the person entering the monitoring area. The close-up video camera 302 has an automatic focusing function, so that the face of the person entering the monitoring area can be clearly imaged.

Image data from the monitoring video camera 301 and the close-up video camera 302 are fed to a recording unit 306 such as a VTR, through a signal selecting circuit 305. Further, the image data from the monitoring video camera 301 is fed to a motion vector detecting circuit 304.

The motion vector detecting circuit 304 detects for each frame motion vectors for a plurality of detecting areas E set in an image area (a monitoring area) 100 of the monitoring video camera 301, as shown in FIG. 3, on the basis of a representative point matching method, similarly to the motion vector detecting circuit 42 shown in FIG. 2.

An output of the motion vector detecting circuit 304 is fed to a control circuit 307 which is constituted by a microcomputer and the like. The control circuit 307 judges whether or not a person moves into the monitoring area on the basis of the output of the motion vector detecting circuit 304, to control the driving of the pan tilt driving device 303, the close-up video camera 302, and the signal selecting circuit 305.

The control circuit 307 judges whether or not a person moves, that is, whether or not a person enters the monitoring area on the basis of the motion vector from the motion vector detecting circuit 304. The control circuit 307 switches, when it judges that the person enters the monitoring area, the image data fed to the recording unit 306 to image data from the close-up video camera 302.

When the control circuit 307 judges that no person enters the monitoring area, the image data from the monitoring video camera 301 is fed to the recording unit 306, so that an image of the whole monitoring area is recorded.

When the control circuit 307 judges that a person enters the monitoring area, the control circuit 307 operates the pan tilt driving device 303, to direct the close-up video camera 302 toward the position where the person exists. The position where the person exists is specified on the basis of the motion vector for each of the plurality of detecting areas E (see FIG. 3), which is obtained from the motion vector detecting circuit 304, set in the image area (the monitoring area) 100 of the monitoring video camera 301. The close-up video camera 304 is operated, to take a close-up of the face of the person and record an image of the face whose close-up has been taken (hereinafter referred to as a close-up image of the face) on the recording unit 306. The closed-up image may be recorded for a predetermined time period. Alternatively, the closed-up image may be recorded, when a person is moving, while moving the camera 302 so as to follow the person. Further, when the close-up image is recorded, an identifier or the like may be simultaneously recorded such that the image to be recorded can be identified from the entire image for convenience of a later search.

When the control circuit 307 judges that no person exists in the monitoring area on the basis of the motion vector from the motion vector detecting circuit 304, the control circuit 307 switches the signal selecting circuit 305 such that the image data from the monitoring video camera 301 for entire observation is fed to the recording unit 306.

As described in the foregoing, when the monitoring area is monitored by the monitoring video camera 301, and the person in the monitoring area moves, the face of the person imaged by the close-up video camera 302 is clearly recorded on the recording unit 306, so that the person can be easily specified.

[5] Description of Fifth Monitoring System

Figure 18:
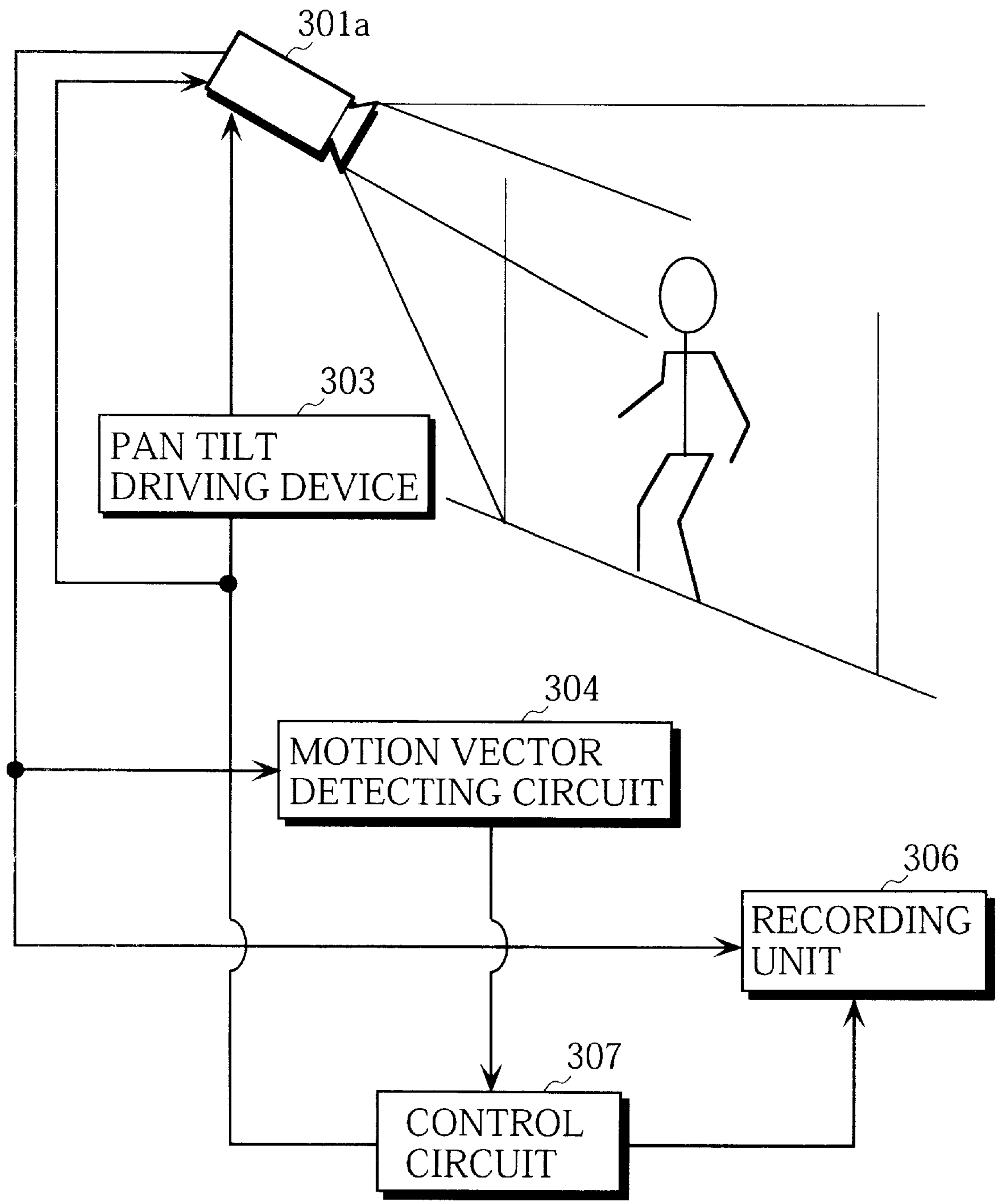
FIG. 18 is a block diagram showing the electrical configuration of a fifth monitoring system.

FIG. 18 illustrates the schematic configuration of a fifth monitoring system.

In the fifth monitoring system, the whole of a monitoring area is imaged, and the face whose close-up has been taken is imaged by one video camera 301*a*. Therefore, the video camera 301a has a zooming function.

The zoom angle of the video camera 301*a* having a zooming function is widened, to monitor the monitoring area A pan tilt driving device 303 for directing the video camera 301*a* toward a person in taking a close-up is mounted on the video camera 301*a*. The video camera 301*a* is moved upward and downward and rightward or leftward by the pan tilt driving device 303, so that the video camera 301*a* is directed toward the face of a person entering the monitoring area. Further, the video camera 301*a* has an automatic focusing function, so that the face of the person entering the monitoring area can be clearly imaged.

Image data from the video camera 301*a* is fed to a recording unit 306 such as a VTR, and is recorded thereon. The image data from the video camera 301*a* is fed to a motion vector detecting circuit 304.

The motion vector detecting circuit 304 detects for each frame motion vectors for a plurality of detecting areas E set in an image area (a monitoring area) 100 of the video camera 301*a*, as shown in FIG. 3, on the basis of a representative point matching method, similarly to the motion vector detecting circuit 42 shown in FIG. 2.

An output from the motion vector detecting circuit 304 is fed to a control circuit 307 which is constituted by a microcomputer and the like. The control circuit 307 judges whether or not a person enters the monitoring area on the basis of the output of the motion vector detecting circuit 304, to carry out control of the driving of the pan tilt driving circuit 303 and the zooming function of the video camera 301*a*.

When the monitoring area is monitored by the video camera 301*a*, and the person in the monitoring area moves, the motion vector detecting circuit 304 calculates the motion vector, and outputs the calculated motion vector. The control circuit 307 judges whether or not the person moves, that is, the person enters the monitoring area on the basis of the motion vector from the motion vector detecting circuit 304.

The control circuit 307 operates, when it judges that the person enters the monitoring area, the pan tilt driving device 303, directs the video camera 301*a* toward the position where the person exists, takes a close-up of the face of the person by the zooming function, and records an image of the face whose close-up has been taken (hereinafter referred to as a close-up image of the face) on the recording unit 306 for a predetermined time period. Further, when the closed-up image is recorded, an identifier or the like may be simultaneously recorded such that the image to be recorded can be identified from the entire image for convenience of a later search.

When the control circuit 307 judges that no person exists in the monitoring area on the basis of the motion vector from the motion vector detecting circuit 304, the control circuit 307 operates t he zooming function of the video camera 301*a* and the pan tit driving devpice 303 such that an image signal for entire observation is fed to the recording unit 306 from the video camera 301*a*.

As described in the foregoing, when the monitoring area is monitored by the one video camera 301*a*, and the person in the monitoring area moves, the face of the person imaged after taking the close-up thereof by the zooming function is clearly recorded on the recording unit 306, so that the person can be easily specified.

Although in the fourth and fifth monitoring systems, the image of the whole monitoring area and the close-up image are switched, and the image obtained by the switching is recorded on the recording unit 306, only an image in a case where the person moves, that is, an image in a case where a motion vector is outputted from the motion vector detecting circuit 304 may be recorded for the purpose of saving a video tape.

When an identifier indicating a closed-up image (an image in a case where a person moves) is recorded on the video tape, a search is significantly easy to make at the time of reproduction if the image is reproduced at high speed when the identifier is not detected, while being reproduced at standard or low speed when it is detected.

Furthermore, when no identifier or the like is recorded, a movement detecting circuit may be provided in a recording and reproducing devlice so that the image is reproduced at high speed when no motion vector is outputted by the movement detecting circuit, while being reproduced at standard or low speed when a motion vector is outputted.

[6] Description of Sixth Monitoring System

Figure 19:
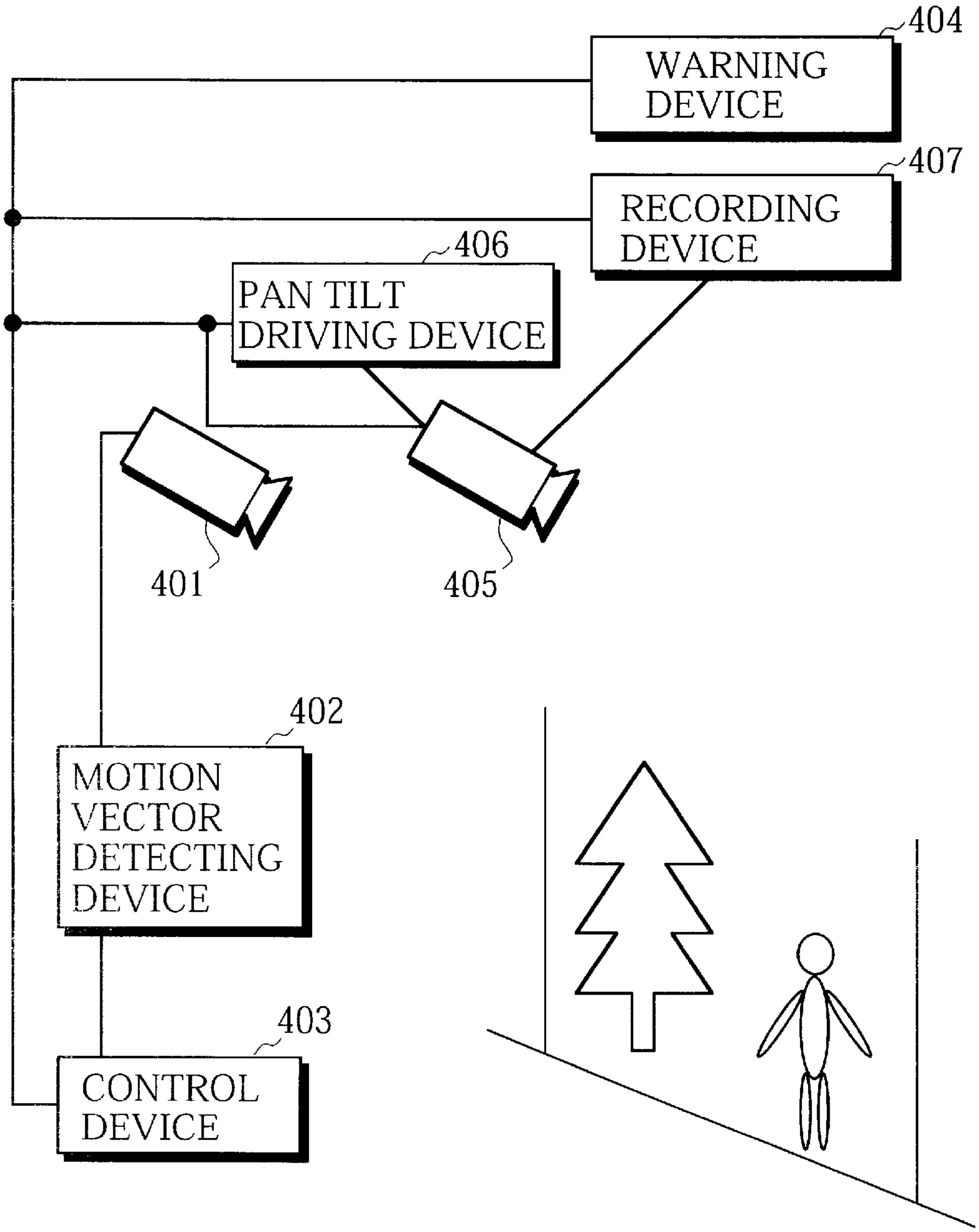
FIG. 19 is a block diagram showing the electrical configuration of a sixth monitoring system.

FIG. 19 illustrates the schematic configuration of a sixth monitoring system.

The sixth monitoring system comprises an infrared camera 401 for imaging a monitoring area. The monitoring area is monitored by the infrared camera 401. The infrared camera 401 receives infrared rays emitted from an object, measures the temperature on the basis of the amount of the infrared rays, forms an image as a signal change depending on the quantity of heat, and feeds an image based on the temperature of a person to a motion vector detecting device 402.

Figure 20A:
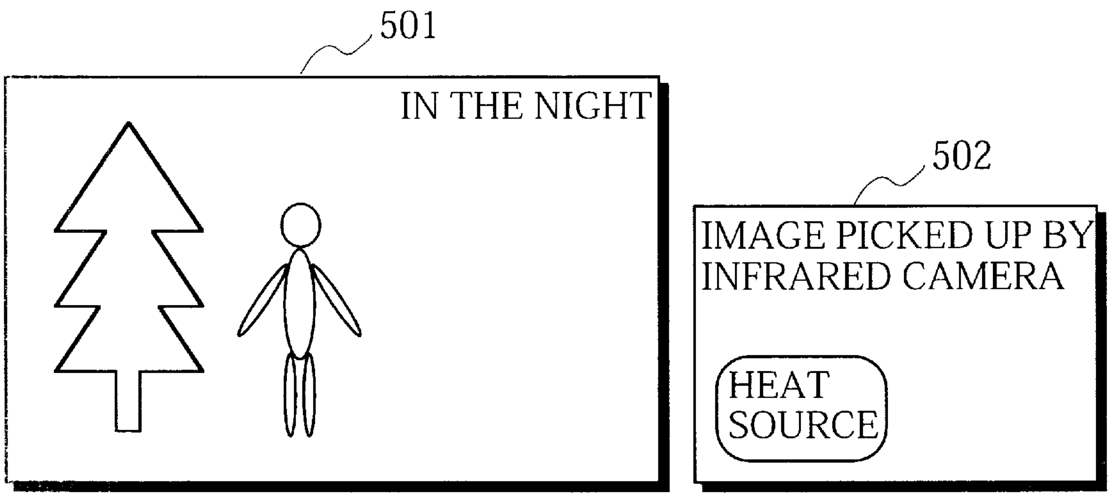
FIGS. 20*a* and 20*b* are schematic views showing an image picked up by an infrared camera.
Figure 20B:
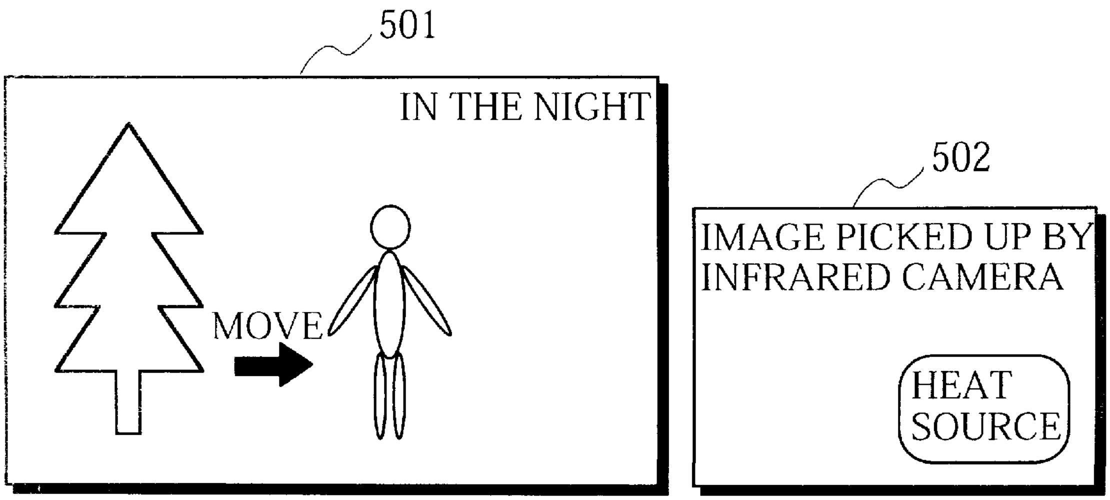

As shown in FIGS. 20*a* and 20*b*, when a monitoring area 501 where there is no light, for example, in the night is monitored by the infrared camera 402, image data having luminance corresponding to the temperature of a person is outputted from the infrared camera 401, as indicated by a picked-up image 502. The image data is fed to a motion vector detecting device 402.

The motion vector detecting device 402 detects a motion vector on the basis of the image data fed from the infrared camera 401. That is, when a person moves from a state shown in FIG. 20*a* to a state shown in FIG. 20*b*, an image of a heat source, for example, a person having temperature is moved. The motion vector is detected on the basis of the movement of the image. Examples of a motion vector detecting method include an all points matching method and a representative point matching method.

In the present embodiment, the motion vector detecting device 402 is so constructed as to detect as a motion vector a change of a signal corresponding to a heat source such as a person having temperature. When changes of signals corresponding to all heat sources are detected as motion vectors, the motion vector is outputted even inacase where a tree, for example, swings by wind or the like, so that a warning device 404 or the like, described later, is operated. In order to prevent such an erroneous operation, only the motion vector for the signal corresponding to the temperature of a person is outputted.

An output from the motion vector detecting device 402 is fed to a control device 403 which is constituted by a microcomputer and the like. The control device 403 judges whether or not a person enters the monitoring area on the basis of the output of the motion vector detecting device 402. The control device 403 drives, when it judges that the person enters the monitoring area, the warning device 404 such as a buzzer. Further, the control device 403 operates, when it judges that the person enters the monitoring area, a pan tilt driving device 406, to direct a CCD camera 405 toward the position where the person exists. The CCD camera 405 is operated, to record an image picked up by the CCD camera 405 on a recording device 407. The CCD camera 405 is provided with an illuminating lamp. If illuminance is insufficient to pick up an image by the CCD camera 405, the illuminating lamp is turned on.

When models of motion vectors caused by the movement of a person are previously registered in the control device 403, the movement of the person can be also distinguished from the movement of an animal such as a dog or a cat, so that it is possible to prevent an erroneous operation of the warning device 404 or the like more reliably.

Although in the above-mentioned embodiment, a person is recorded by the CCD camera 405, another recording means such as a Polaroid camera may be used.

[7] Description of Imaging System

Figure 21:
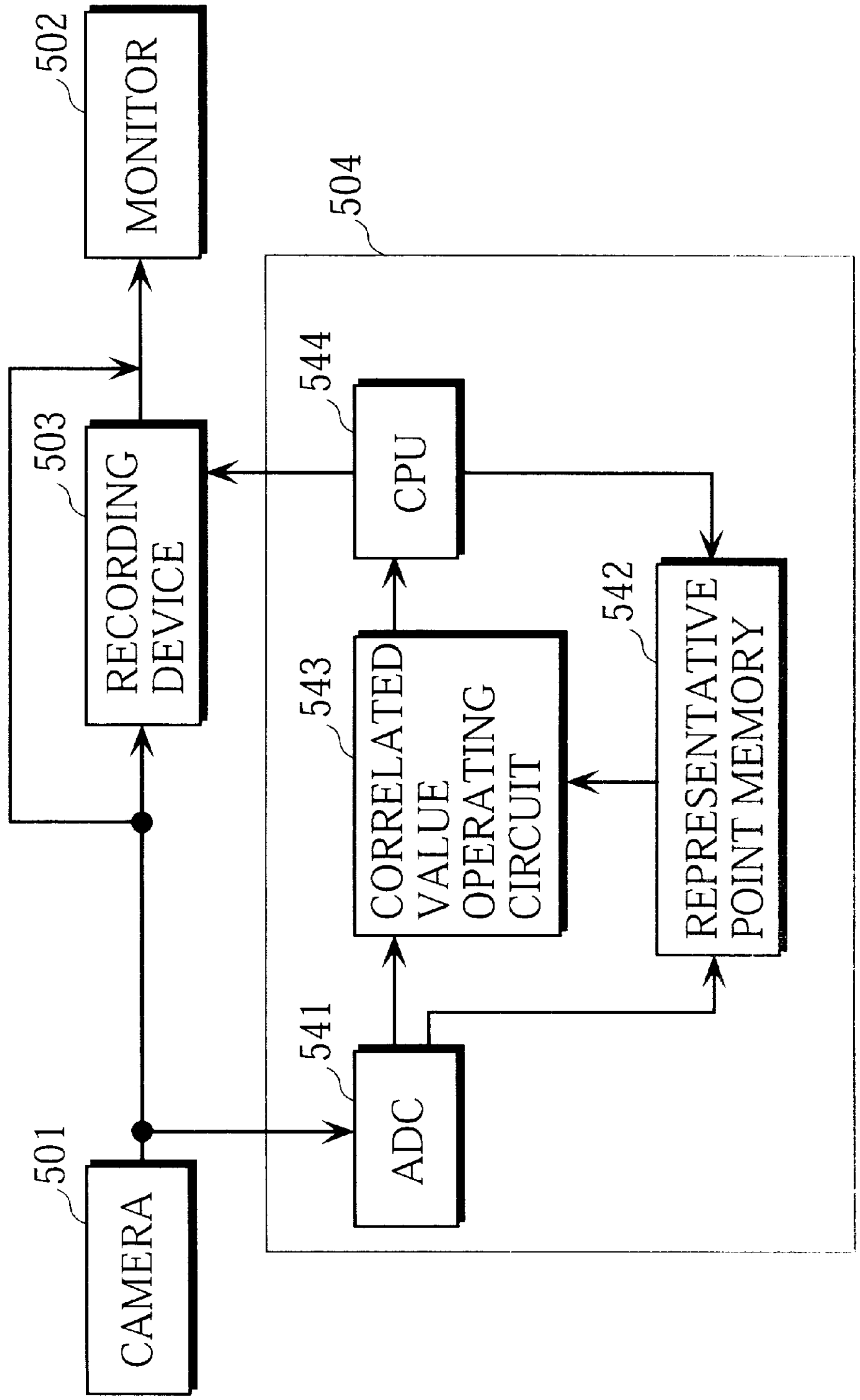
FIG. 21 is a block diagram showing the electrical configuration of an imaging system.

FIG. 21 illustrates the configuration of an imaging system.

The imaging system comprises a video camera 501 for imaging a subject, a monitor 502 for displaying an image picked up by the video camera 501, a recording device 503 for recording the image picked up by the video camera 501, and a movement monitoring device 504 for monitoring the amount of movement of the subject.

An output of the video camera 501 is fed to the monitor 502, the recording device 503, and the movement monitoring device 504. The image picked up by the video camera 501 is always displayed on the monitor 502. The recording device 503 is controlled on the basis of a control signal from the movement monitoring device 504.

The movement monitoring device 504 detects the amount of movement of the subject in the same method as a representative point matching method,and comprises an analog-to-digital converter (ADC) 541, a representative point memory 542, a correlated value operating circuit 543, and a CPU 544. The CPU 544 comprises a ROM (not shown) storing its program and the like and a RAM (not shown) storing necessary data.

Description is made of a motion vector detecting method based on a normal representative point matching method. As shown in FIG. 3, a plurality of detecting areas E are set in an image area (a monitoring area) 100 of the video camera 501. Each of the detecting areas E is further divided into a plurality of small areas e, as shown in FIG. 4. As shown in FIG. 5, a plurality of sampling points S and one representative point R are set in each of the small areas e.

A difference between the image signal level at each of the sampling points S in the small area e in the current frame (hereinafter referred to as sampling point data) and the image signal level at the representative point R in a corresponding small area e in the preceding frame (hereinafter referred to as representative point data) that is, a correlated value at each of the sampling points S is found for each of the detecting areas E. For each of the detecting areas E, the sum of correlated values at the sampling points S which are the same in deviation from the representative point R in all the small areas e in the detecting area E is found (a value obtained is hereinafter referred to as an accumulated correlated value). Consequently, accumulated correlated values whose number corresponds to the number of the sampling points S in one of the small areas e are formed for each of the detecting areas E.

Deviation of the sampling point S having the minimum accumulated correlated value, that is, having the highest correlation in each of the detecting areas E is extracted as a motion vector (the movement of an object) in the detecting area E.

Although in the above-mentioned normal motion vector detecting method, motion vectors corresponding to the amount of movement of the subject from the preceding frame are calculated for each frame, the difference between the representative point data at the previous recording time and the sampling point data obtained for each frame, that is, the correlated value at each of the sampling points is found in the present embodiment, so that motion vectors corresponding to the amount of movement of the subject from the previous recording time are calculated.

The ADC 541 converts an analog image signal outputted from the video camera 501 into a digital image signal. The representative point data in the obtained digital image signal is fed to the representative point memory 542. The writing of the representative point data into the representative point memory 542 is controlled by the CPU 544.

The sampling point data in the digital image signal obtained by the ADC 541 is inputted to the correlated value operating circuit 543. The correlated value operating circuit 543 finds for each of the detecting areas E the difference between each of the sampling point data in the current frame and the representative point data stored in the representative point memory 542, that is, a correlated value at each of the sampling points, and finds, for each of the detecting areas E, the sum of correlated values at the sampling points S which are the same in deviation from the representative points R in all the small areas e in the detecting area E (a value obtained is hereinafter referred to as an accumulated correlated value).

The accumulated correlated value found for each of the detecting areas E is fed to the CPU 544. The CPU 544 extracts deviation of the sampling point Shaving the minimum accumulated correlated value, that is, having the highest correlation in each of the detecting areas E as a motion vector in the detecting area E. The recording device 503 is controlled on the basis of the obtained motion vector.

Figure 22:
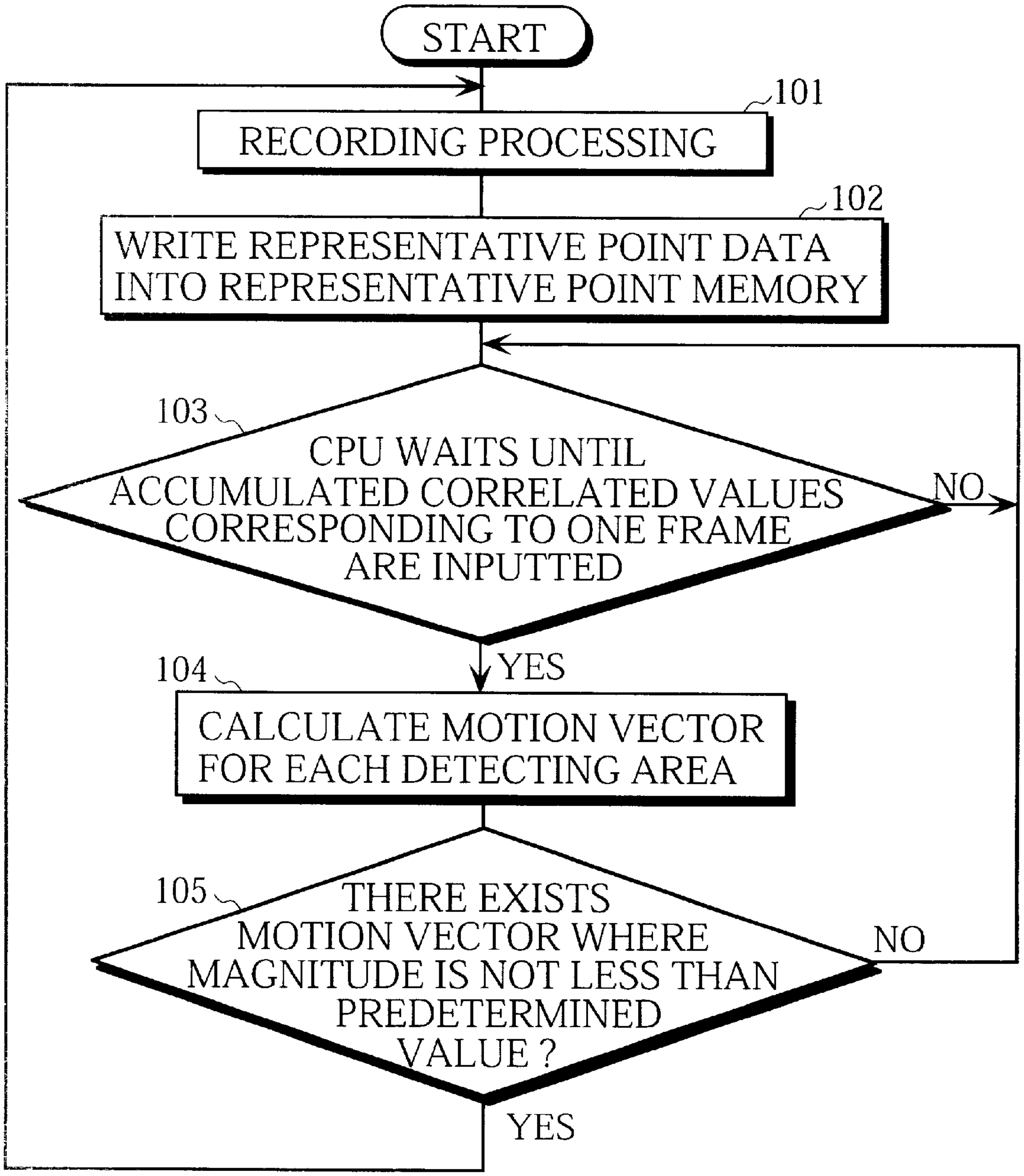
FIG. 22 is a flow chart showing the procedure for recording control processing performed by a CPU.

FIG. 22 shows the procedure for recording control processing performed by the CPU 544.

Picked-up images, which correspond to one or several frames, obtained by the video camera 501 are first recorded by the recording device 503 (step 101). Representative point data corresponding to one frame which are currently fed to the representative point memory 542 are written into the representative point memory 542 (step 102).

Thereafter, when accumulated correlated values corresponding to one frame are inputted from the correlated value operating circuit 543 (step 103), a motion vector is calculated for each of the detecting areas E (step 104). That is, information relating to the movement of the subject from the previous recording time is calculated.

It is judged whether or not there exists a motion vector whose magnitude is not less than a predetermined value out of the motion vectors calculated for the detecting areas E (step 105).

When there exists no motion vector whose magnitude is not less than the predetermined value out of the motion vectors calculated for the detecting areas E, the program is returned to the step 103. Consequently, the processing at the steps 103, 104 and 105 is always repeatedly performed.

When it is judged at the step 105 that there exists the motion vector whose magnitude is not less than the predetermined value out of the motion vectors calculated for the detecting areas E, it is judged that the amount of movement of the subject from the previous recording time becomes not less than the predetermined value, after which the program is returned to the step 101. In this case, therefore, picked-up images, which correspond to one or several frames, obtained by the video camera 501 are recorded by the recording device 503. Further, representative point data, which correspond to one frame, currently fed to the representative point memory 542 are written into the representative point memory 542. That is, the contents of the representative point memory 542 are updated. The program proceeds to the step 103.

According to the recording control processing shown in FIG. 22, recording is made every time the amount of movement of the subject from the previous recording time becomes not less than the predetermined value.

Figure 23:
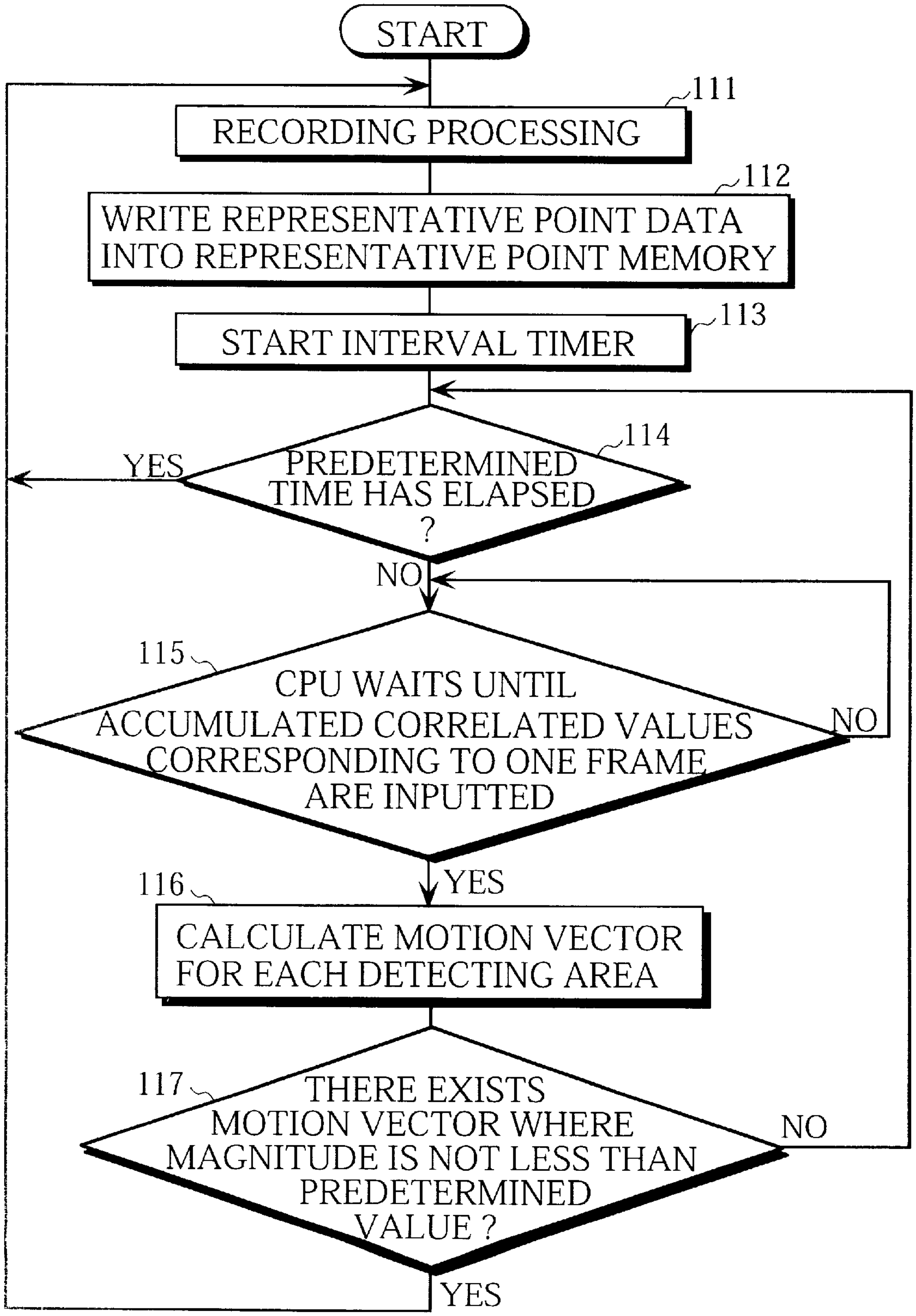
FIG. 23 is a flow chart showing another example of recording control processing.

FIG. 23 shows another example of recording control processing performed by the CPU 544.

The recording control processing differs from the recording control processing shown in FIG. 22 in that recording is made, unless the amount of movement of a subject from the previous recording time becomes not less than a predetermined value until a predetermined time period has elapsed since the previous recording time, at the time point where the predetermined time period has elapsed since the previous recording time.

Picked-up images, which correspond to one or several frames, obtained by the video camera 501 are first recorded by the recording device 502 (step 111) Representative point data corresponding to one frame which are currently fed to the representative point memory 542 are written into the representative point memory 542 (step 112). An interval timer for measuring a predetermined time period T is started (step 113).

Thereafter, it is judged whether or not the predetermined time period T has elapsed since the interval timer was started (step 114). When the predetermined time period T has not elapsed since the interval timer was started, the CPU 222 waits until accumulated correlated values corresponding to one frame are inputted from the correlated value operating circuit 543 (step 115).

When the accumulated correlated values corresponding to one frame are inputted from the correlated value operating circuit 543 (step 115), a motion vector is calculated for each of the detecting areas E (step 116). That is, information relating to the movement of the subject from the previous recording time is calculated.

In is judged whether or not there exists a motion vector whose magnitude is not less than the predetermined value out of the motion vectors calculated for the detecting areas (step 117).

When there exists no motion vector whose magnitude is not less than the predetermined value out of the motion vectors calculated for the detecting areas E, the program is returned to the step 114. Consequently, the processing at the steps 114, 115, 116 and 117 is always repeatedly performed.

When it is judged at the step 117 that there exists the motion vector whose magnitude is not less than the predetermined value out of the motion vectors calculated for the detecting areas E, it is judged that the amount of movement of the subject from the previous recording time becomes not less than the predetermined value, after which the program is returned to the step 111. In this case, therefore, picked-up images, which correspond to one or several frames, obtained by the video camera 501 are recorded by the recording device 503. Further, representative point data, which correspond to one frame, currently fed to the representative point memory 542 are written into the representative point memory 542. That is, the contents of the representative point memory 542 are updated. Further, the interval timer is started again. The program proceeds to the step 114.

Even when it is judged at the step 114 that the predetermined time period has not elapsed since the interval timer was started, the program is returned to the step 111. In this case, therefore, picked-up images, which correspond to one or several frames, obtained by the video camera 501 are also recorded by the recording device 503. Further, representative point data, which correspond to one frame, currently fed to the representative point memory 542 are written into the representative point memory 542. That is, the contents of the representative point memory 542 are updated. Further, the interval timer is started again. The program proceeds to the step 114.

An electronic still camera (a digital camera) may be used as a combination of the video camera 501 and the recording device 503. In this case, the on-off control of a shutter of the electronic still camera is carried out by the movement monitoring device 504.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A monitoring system comprising:

an imaging device for imaging a monitoring area;

means for detecting information corresponding to amount of movement of an object in the monitoring area on the basis of an output of the imaging device;

means for judging whether or not a person to be monitored exits from the monitoring area on the basis of the information relating to the movement of the object; and reporting means for reporting, when it is judged that the person to be monitored exits from the monitoring area, to a supervisor that the person to be monitored exits from the monitoring area.

2. A monitoring system comprising:

a recording device;

first imaging means for imaging a whole monitoring area;

second imaging means for taking a close-up of a part of the monitoring area and imaging the part whose close-up has been taken, the second imaging means being imaging means other than the first imaging means and having an automatic focusing function;

a switch for switching between an output of the first imaging means and an output of the second imaging means and feeding the output obtained by the switching to the recording device;

a pan tilt driving device for moving the second imaging means upward, downward, rightward and leftward;

detection means for detecting an amount of movement of an object in the monitoring area on the basis of an output of the first imaging means;

first control means for controlling the switch such that the output of the first imaging means is fed to the recording device when the movement of the object in the monitoring area is not detected by the detection means; and second control means for controlling the pan tilt driving device, when the movement of the object in the monitoring area is detected by the detection means, wherein the pan tilt driving device directs the second imaging means at the moving object in the monitoring area, thereby to make the second imaging means take a close-up of the moving object and image the object, the second control means further for controlling the switch such that the output of the second imaging means is fed to the recording device.

* * * * *